United States Patent
Kim et al.

(10) Patent No.: US 10,904,874 B2
(45) Date of Patent: Jan. 26, 2021

(54) METHOD FOR TRANSMITTING AND RECEIVING DATA IN WIRELESS COMMUNICATION SYSTEM, AND DEVICE THEREFOR

(71) Applicant: LG Electronics Inc., Seoul (KR)

(72) Inventors: Kyuseok Kim, Seoul (KR); Hyungtae Kim, Seoul (KR); Jiwon Kang, Seoul (KR); Sukhyon Yoon, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/824,990

(22) Filed: Mar. 20, 2020

(65) Prior Publication Data
US 2020/0221435 A1    Jul. 9, 2020

Related U.S. Application Data

(63) Continuation of application No. PCT/KR2018/013823, filed on Nov. 13, 2018.
(Continued)

(51) Int. Cl.
*H04L 5/00* (2006.01)
*H04W 72/04* (2009.01)

(52) U.S. Cl.
CPC ......... *H04W 72/042* (2013.01); *H04L 5/0048* (2013.01)

(58) Field of Classification Search
CPC ... H04L 5/0053; H04L 5/0048; H04L 5/0051; H04L 5/001; H04L 5/0007; H04L 5/0023;
(Continued)

(56) References Cited

U.S. PATENT DOCUMENTS

| | | | |
|---|---|---|---|
| 9,408,096 B2* | 8/2016 | Kim | H04W 24/08 |
| 2015/0208394 A1* | 7/2015 | Seo | H04W 72/042 |
| | | | 370/329 |
| 2016/0013903 A1* | 1/2016 | Kim | H04L 5/0048 |
| | | | 370/329 |
| 2016/0013905 A1* | 1/2016 | Seo | H04L 1/0026 |
| | | | 370/329 |

(Continued)

FOREIGN PATENT DOCUMENTS

| | | |
|---|---|---|
| EP | 3208949 | 8/2017 |
| WO | WO2017008210 | 1/2017 |

OTHER PUBLICATIONS

Huawei, HiSilicon, "Evaluation results of DMRS design for DL/UL data channel," R1-1718247, 3GPP TSG RAN WG1 Meeting #90bis, Prague, Czech Republic, dated Oct. 9-13, 2017, 18 pages.

(Continued)

*Primary Examiner* — Sai Aung
(74) *Attorney, Agent, or Firm* — Fish & Richardson P.C.

(57) ABSTRACT

The present invention relates to a method and device for operating a terminal in a wireless communication system. According to the present invention, downlink control information is transmitted to a terminal and can include symbol information related to the last symbol of a downlink shared channel. A method and device can be provided wherein a terminal transmits a first demodulation reference signal (DMSR) and at least one second DMRS for demodulating downlink data, and transmits data through the downlink shared channel, and a symbol position to which the at least one second DMRS is mapped is determined according to the symbol information.

18 Claims, 26 Drawing Sheets

Related U.S. Application Data

(60) Provisional application No. 62/586,214, filed on Nov. 15, 2017, provisional application No. 62/585,457, filed on Nov. 13, 2017.

(58) Field of Classification Search
CPC ... H04L 5/0094; H04L 5/005; H04L 25/0226; H04L 1/0031; H04L 1/0045; H04L 1/0046; H04L 1/0061; H04L 1/0072; H04L 1/0073; H04L 27/2613; H04W 72/042; H04W 72/04; H04W 84/047; H04W 24/08; H04W 52/245; H04W 52/42; H04W 72/005; H04W 72/0413
See application file for complete search history.

(56) References Cited

U.S. PATENT DOCUMENTS

| | | | |
|---|---|---|---|
| 2016/0013909 A1* | 1/2016 | Kim | H04L 5/0048 370/329 |
| 2016/0014728 A1* | 1/2016 | Seo | H04L 5/0053 370/329 |
| 2016/0037485 A1* | 2/2016 | Lee, II | H04L 5/0051 370/312 |

OTHER PUBLICATIONS

LG Electronics, "On DMRS design," R1-1717946, 3GPP TSG RAN WG1 Meeting #90bis, Prague, Czech Republic, dated Oct. 9-13, 2017, 14 pages.
Qualcomm Incorporated, "Discussion on DL DMRS design," R1-1700806, 3GPP TSG-RAN WG1 NR Ad-Hoc, Spokane, Washington, USA, dated Jan. 16-20, 2017, 6 pages.
3rd Generation Partnership Project; Technical Specification Group Radio Access Network; NR; "Physical channels and modulation (Release 15)," 3GPP TS 38.211, dated Oct. 2017, 46 pages.
3rd Generation Partnership Project; Qualcomm; "3rd Generation Partnership Project," R1-1716783, 3GPP TSG RAN WG, Nagoya, Japan, dated Sep. 2017, 30 pages.
3rd Generation Partnership Project; Huawei, HiSilicon; "DCI contents and formats in NR," R1-1717064, 3GPP TSG RAN WG1, Prague, Czech Republic, dated Oct. 2017, 10 pages.
Office Action in Korean Appln. No. 10-2020-7013141, dated Jun. 9, 2020, 12 pages (with English translation).
Ericsson, "On DL DMRS design," R1-1714310, 3GPP TSG-RAN WG1 #90, Prague, Czechia, Aug. 21-25, 2017, 7 pages.
Korean Notice of Allowance in Korean Appln. No. 10-2020-7013141, dated Sep. 1, 2020, 5 pages (with English translation).
NTT Docomo, Inc., "Remaining details on DM-RS," R1-1718198, 3GPP TSG RAN WG1 Meeting #90bis, Prague, Czech Republic, Oct. 9-13, 2017, 12 pages.
Qualcomm, "Remaining issues on NR DM-RS," R1-1715082, 3GPP TSG RAN WG1 Meeting #90, Aug. 21-25, 2017, Prague, Czech Republic, 19 pages.
Extended European Search Report in European Appln. No. 18876553.1, dated Nov. 19, 2020, 9 pages.
Spreadtrum Communications, "Considerations on DMRS for CP-OFDM," R1-1715512, 3GPP TSG RAN WG1 Meeting NR#3, Nagoya, Japan, Sep. 18-21, 2017, 12 pages.
ZTE, Sanechips, "Remaining details on DL DMRS and UL DMRS," R1-1717433, 3GPP TSG RAN WG1 Meeting 90bis, Prague, CZ, Oct. 9-13, 2017, 8 pages.

* cited by examiner

FIG. 15
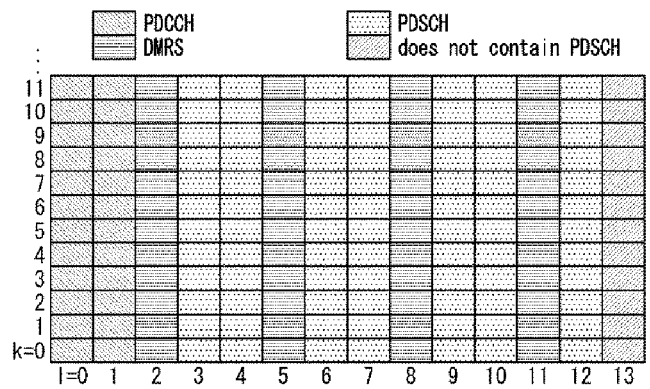
FIG. 15A
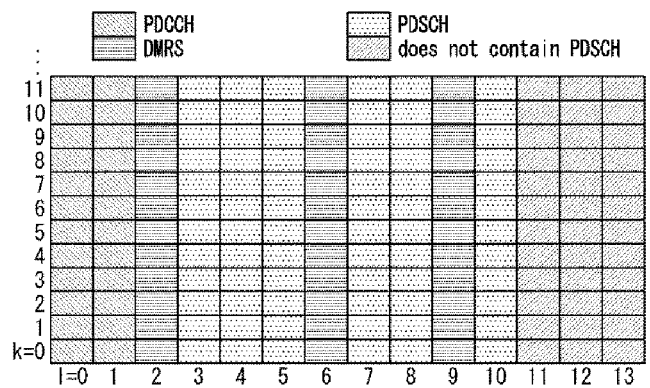
FIG. 15B
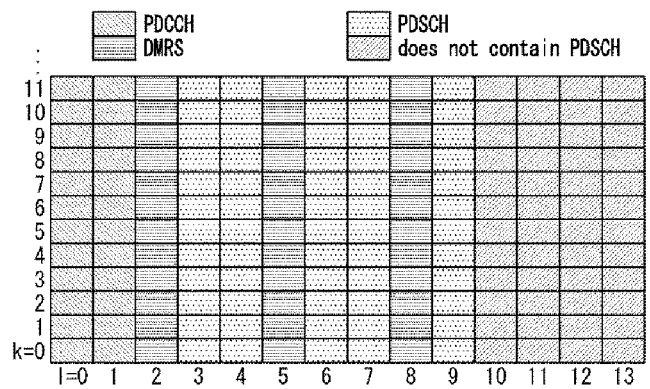
FIG. 15C

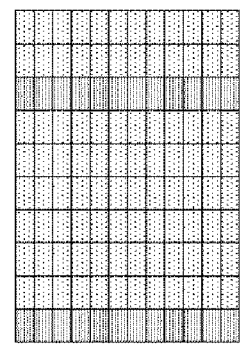
FIG.16A
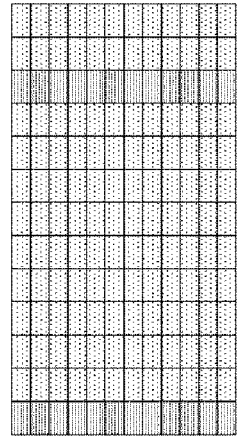
FIG. 16B
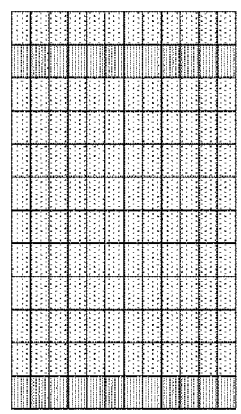
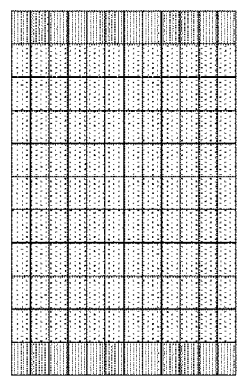
FIG. 16C

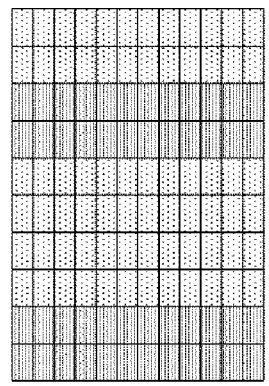
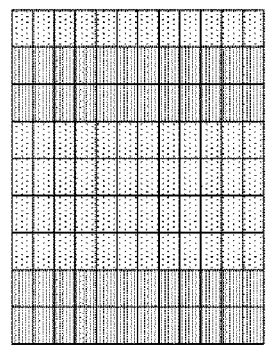
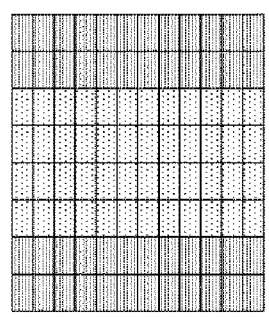
FIG. 17A
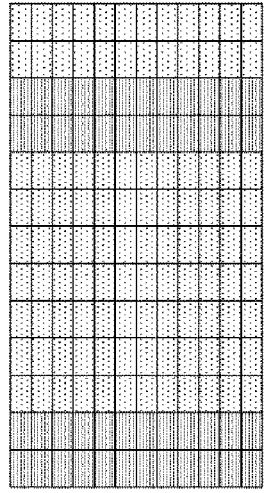
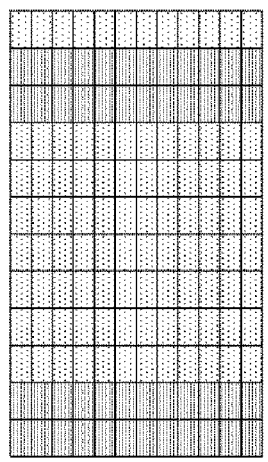
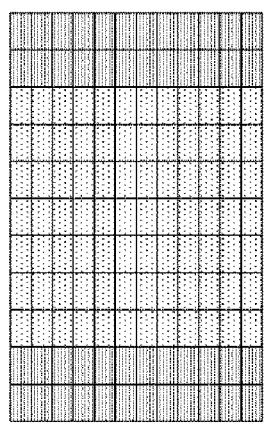
FIG. 17B

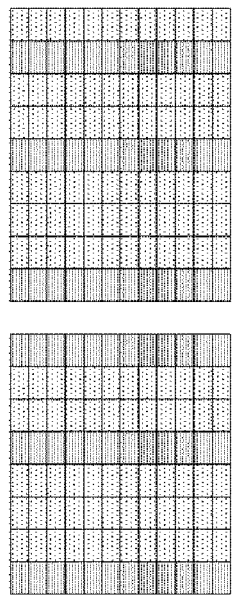
FIG. 18A
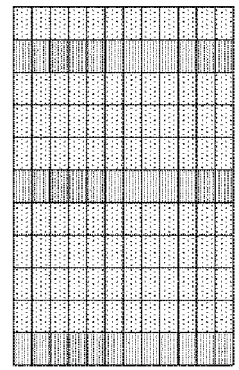
FIG. 18B
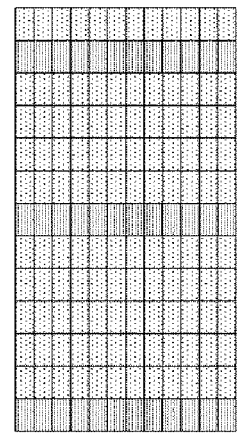
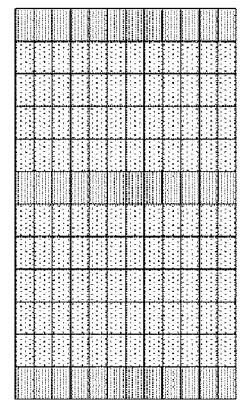
FIG. 18C

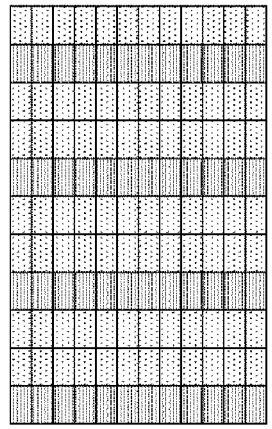
FIG. 19A
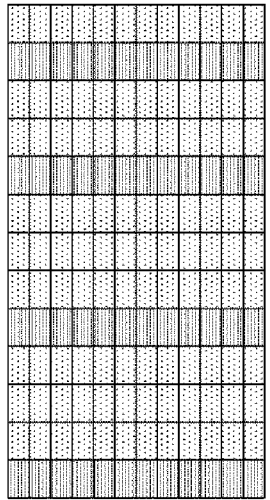
FIG. 19B
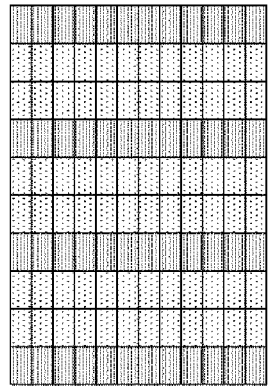

METHOD FOR TRANSMITTING AND RECEIVING DATA IN WIRELESS COMMUNICATION SYSTEM, AND DEVICE THEREFOR

CROSS-REFERENCE TO RELATED APPLICATIONS

This application is a continuation application of International Application No. PCT/KR2018/013823, filed on Nov. 13, 2018, which claims the benefit of U.S. Provisional Application No. 62/585,457, filed on Nov. 13, 2017, and No. 62/586,214, filed on Nov. 15, 2017, the contents of which are all hereby incorporated by reference herein in their entirety.

TECHNICAL FIELD

The present disclosure relates to a wireless communication system, and more particularly, to a method and device for generating and transmitting a demodulation reference signal (DMRS) for transmitting and receiving data in a wireless communication system.

BACKGROUND ART

A mobile communication system has been developed to provide voice services while ensuring the activity of a user. However, the mobile communication system has been expanded to its region up to data services in addition to the voice. Today, the shortage of resources is caused due to an explosive increase of traffic, and thus there is a need for a more advanced mobile communication system because users require higher speed services.

Requirements for a next-generation mobile communication system basically include the accommodation of explosive data traffic, a significant increase of a transfer rate per user, the accommodation of the significantly increased number of connection devices, very low end-to-end latency, and high energy efficiency. To this end, research is carried out on various technologies, such as dual connectivity, massive multiple input multiple output (MIMO), in-band full duplex, non-orthogonal multiple access (NOMA), super broadband support, and device networking.

SUMMARY

The present disclosure provides a method of generating and transmitting a demodulation reference signal (DMRS) for transmitting and receiving data.

The present disclosure further provides a method of determining a location of a symbol to which a DMRS is mapped when a terminal receives a plurality of DMRSs.

The present disclosure further provides a method of determining a location of a symbol to which a DMRS is mapped when transmitting DMRSs of the number fewer than the maximum number of DMRSs determined by a higher layer.

The present disclosure further provides a method of determining a location of a symbol to which a DMRS for demodulating transmitted data is mapped before information related to mapping of a DMRS is transmitted from a base station.

The technical problem of this disclosure is not limited to the above-described technical problems and the other technical problems will be understood by those skilled in the art from the following description.

A method in which a terminal transmits and receives data in a wireless communication system includes receiving downlink control information from a base station, wherein the downlink control information includes symbol information related to a last symbol of a downlink shared channel; receiving a first demodulation reference signal (DMSR) and at least one second DMRS for demodulating downlink data; and receiving data through the downlink shared channel, wherein a symbol position to which the at least one second DMRS is mapped is determined according to the symbol information.

Further, the method further includes obtaining number information representing the maximum number of symbols to which the at least one second DMRS is mapped from the base station, wherein the symbol position is determined according to the symbol information and the number information.

Further, when the at least one second DMRS is mapped to symbols of the number fewer than the maximum number, the at least one second DMRS is mapped to a symbol at the same location as a mapping position of the second DMRS having the fewer number as the maximum number of symbols to which the DMRS is mapped.

Further, when the downlink shared channel is transmitted earlier than higher layer signaling, a maximum value of a symbol to which the at least one second DMRS is mapped is set to a specific value.

Further, the symbol position is determined according to the specific value and the symbol information.

Further, when the at least one second DMRS is mapped to symbols of the specific number or more, the symbol position is shifted according to a position of a symbol to which the first DMRS is mapped.

Further, the number information is received through Radio Resource Control (RRC) signaling.

A method in which a base station transmits and receives data in a wireless communication system includes transmitting downlink control information to a terminal, wherein the downlink control information includes symbol information related to a last symbol of a downlink shared channel; transmitting a first demodulation reference signal (DMSR) and at least one second DMRS for demodulating downlink data; and transmitting data through the downlink shared channel, wherein a symbol position to which the at least one second DMRS is mapped is determined according to the symbol information.

A terminal for transmitting and receiving data in a wireless communication system includes a radio frequency (RF) module for transmitting and receiving a radio signal; and a processor functionally connected to the RF module, wherein the processor is configured to receive downlink control information from a base station, wherein the downlink control information includes symbol information related to a last symbol of a downlink shared channel, to receive a first demodulation reference signal (DMSR) and at least one second DMRS for demodulating downlink data, and to receive data through the downlink shared channel, wherein a symbol position to which the at least one second DMRS is mapped is determined according to the symbol information.

According to the present disclosure, by determining a location of a symbol to which a DMRS is mapped according to the maximum number of symbols to which a DMRS is mapped and a physical channel in which data are transmitted, scheduling flexibility of a base station can be increased.

Further, according to the present disclosure, when a DMRS is set to the number fewer than the number set by higher layer signaling, by mapping the DMRS to the same location as that of a preset value in which the number equal to the preset number of DMRSs is the maximum number, the DMRS can be efficiently mapped.

Further, according to the present disclosure, when the DMRS is set to the number fewer than the number set by higher layer signaling, by mapping the DMRS to the same location as that of a preset value in which the number equal to the preset number of DMRSs is the maximum number, MU-MIMO is possible even between terminals having the maximum number different from that of symbols to which the DMRS is mapped.

Further, according to the present disclosure, by setting a location to which a DMRS for demodulating transmitted data is to be mapped before higher layer signaling including information related to the DMRS is transmitted, before higher layer signaling is transmitted, the transmitted data can be received and demodulated.

The effect of this disclosure is not limited to the above-described effects and the other effects will be understood by those skilled in the art from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

FIGS. 14A to 15C are diagrams illustrating another example of a method of mapping a DMRS when demodulation references of the number smaller than the maximum number proposed in the present disclosure are set.

FIGS. 16A to 18C are diagrams illustrating another example of a method of mapping a DMRS proposed in the present disclosure.

FIGS. 19A to 20B are diagrams illustrating another example of a method of mapping a DMRS proposed in the present disclosure.

DETAILED DESCRIPTION

Figure 1A:
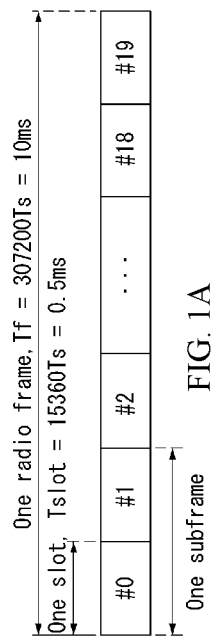
FIG. 1A to 1B are diagrams illustrating the structure of a radio frame in a wireless communication system to which the present disclosure may be applied.

Reference will now be made in detail to the preferred embodiments of the present disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present disclosure. However, it will be apparent to those skilled in the art that these teachings may be implemented and practiced without these specific details.

In some instances, known structures and devices are omitted, or are shown in a block diagram form focused on important features of the structures and devices in order to avoid making obscure the concept of the present disclosure.

In this disclosure, a base station has a meaning as a terminal node of a network, directly communicating with a terminal. In this document, a specific operation illustrated as being performed by a base station may be performed by an upper node of the base station according to circumstances. That is, it is evident that in a network including multiple network nodes including a base station, various operations performed for communication with a terminal may be performed by the base station or other network nodes other than the base station. A "base station (BS)" may be substituted with a term, such as a fixed station, a Node B, an evolved-NodeB (eNB), a base transceiver system (BTS), an access point (AP) or a transmission stage. Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a mMachine-type communication (MTC) device, a machine-tomachine (M2M) device, a device-to-device (D2D) device, a reception stage or TRP(transmission reception point).

Hereinafter, downlink (DL) refers to communication from a base station to a UE, and uplink (UL) refers to communication from a UE to a base station. In downlink, a transmitter may be part of a base station, and a receiver may be part of a UE. In uplink, a transmitter may be part of a UE, and a receiver may be part of a base station.

Specific terms used in the following description are provided to help understanding of the present disclosure. The use of such specific terms may be changed in other forms without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A is primarily described for clear description, but technical features of the present disclosure are not limited thereto.

Figure 1B:
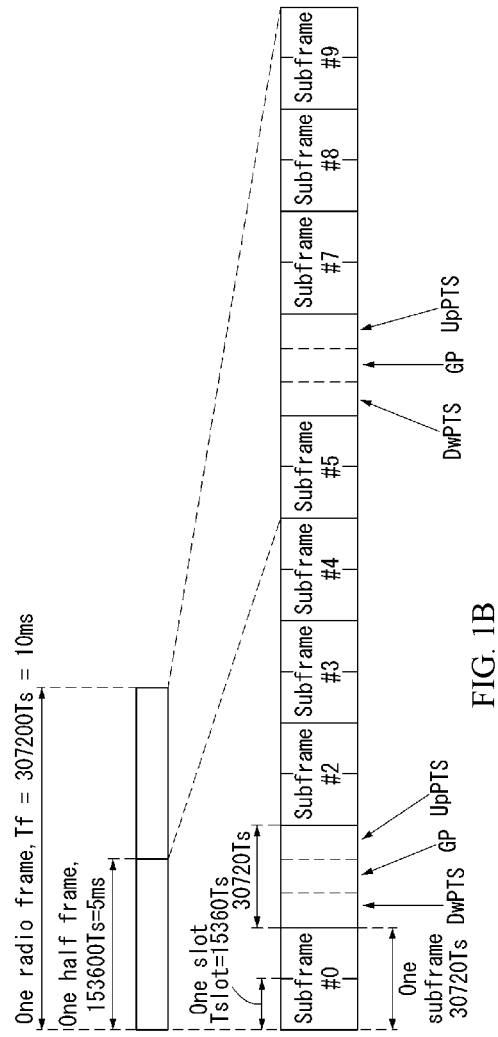

General wireless communication system to which the present disclosure may be applied FIGS. 1A to 1B shows the structure of a radio frame in a wireless communication system to which the present disclosure may be applied.

3GPP LTE/LTE-A supports a type 1 radio frame structure applicable to frequency division duplex (FDD) and a type 2 radio frame structure applicable to time division duplex (TDD).

In FIGS. 1A to 1B, the size of the radio frame in the time domain is represented as a multiple of a time unit of $T\_s=1/(15000*2048)$. Downlink and uplink transmission are configured with a radio frame having a period of $T\_f=307200*T\_s=10$ ms.

FIG. 1A illustrates the structure of the type 1 radio frame. The Type 1 radio frame may be applied to both full duplex and half duplex FDD.

The radio frame includes 10 subframes. One radio frame includes 20 slots of $T\_slot=15360*T\_s=0.5$ ms length. The slots are assigned indices from 0 to 19. One subframe includes contiguous 2 slots in the time domain, and a subframe i includes a slot $2i$ and a slot $2i+1$. The time taken to transmit one subframe is called a transmission time period (TTI). For example, the length of one subframe may be 1 ms, and the length of one slot may be 0.5 ms.

In FDD, uplink transmission and downlink transmission are divided in the frequency domain. There is no limit to full duplex FDD, whereas a user equipment cannot perform transmission and reception at the same time in a half duplex FDD operation.

One slot includes a plurality of orthogonal frequency division multiplexing (OFDM) symbols in the time domain and includes multiple resource blocks (RBs) in the frequency domain. 3GPP LTE uses OFDMA in downlink, and thus an OFDM symbol is for representing one symbol period. An OFDM symbol may be called one SC-FDMA symbol or symbol period. A resource block is a resource allocation unit, and includes a plurality of contiguous subcarriers in one slot.

FIG. 1B shows the frame structure type 2.

A type 2 radio frame includes 2 half frames, each one having a length of $153600*T\_s=5$ ms. Each half frame includes 5 subframes having a length of $30720*T\_s=1$ ms.

In the frame structure type 2 of a TDD system, an uplink-downlink configuration is a rule indicating whether uplink and downlink are allocated (or reserved) with respect to all subframes.

Table 1 shows an uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of a radio frame, "D" indicates a subframe for downlink transmission, "U" is a subframe for uplink transmission, and "S" indicates a special subframe including three fields of a downlink pilot time slot (DwPTS), a guard period (GP), and an uplink pilot time slot (UpPTS).

The DwPTS is used for initial cell search, synchronization or channel estimation in a user equipment. The UpPTS is used to perform channel estimation in a base station and uplink transmission synchronization for a user equipment. The GP is a period for removing interference occurring in uplink due to the multi-path delay of a downlink signal between uplink and downlink.

Each subframe i includes a slot $2i$ and a slot $2i+1$, each one having a length of $T\_slot=15360*T\_s=0.5$ ms.

An uplink-downlink configuration may be divided into 7 types. The position and/or number of downlink subframes, special subframes, uplink subframes are different for each configuration.

A point of time switching from the downlink to the uplink or a point of time switching from the uplink to the downlink is called a switching point. Switching point periodicity means the period in which an aspect in which an uplink subframe and a downlink subframe switch is identically repeated, and supports both 5 ms and 10 ms. In the case of the 5 ms downlink-uplink switching point periodicity, a special subframe S is present in each half-frame. In the case of the 5 ms downlink-uplink switching point periodicity, a special subframe S is present only in the first half-frame.

In all configurations, Nos. 0 and 5 subframe and a DwPTS are an interval for only downlink transmission. An UpPTS and a subframe subsequent to a subframe is always an interval for uplink transmission.

Such an uplink-downlink configuration is system information and may be known to both a base station and a user equipment. The base station may notify the user equipment of a change in the uplink-downlink allocation state of a radio frame by transmitting only the index of configuration information whenever uplink-downlink configuration information is changed. Furthermore, the configuration information is a kind of downlink control information and may be transmitted through a physical downlink control channel (PDCCH) like other scheduling information. The configuration information is broadcast information and may be transmitted to all user equipments within a cell in common through a broadcast channel.

Table 2 shows the configuration of a special subframe (the length of DwPTS/GP/UpPTS).

Figure 3:
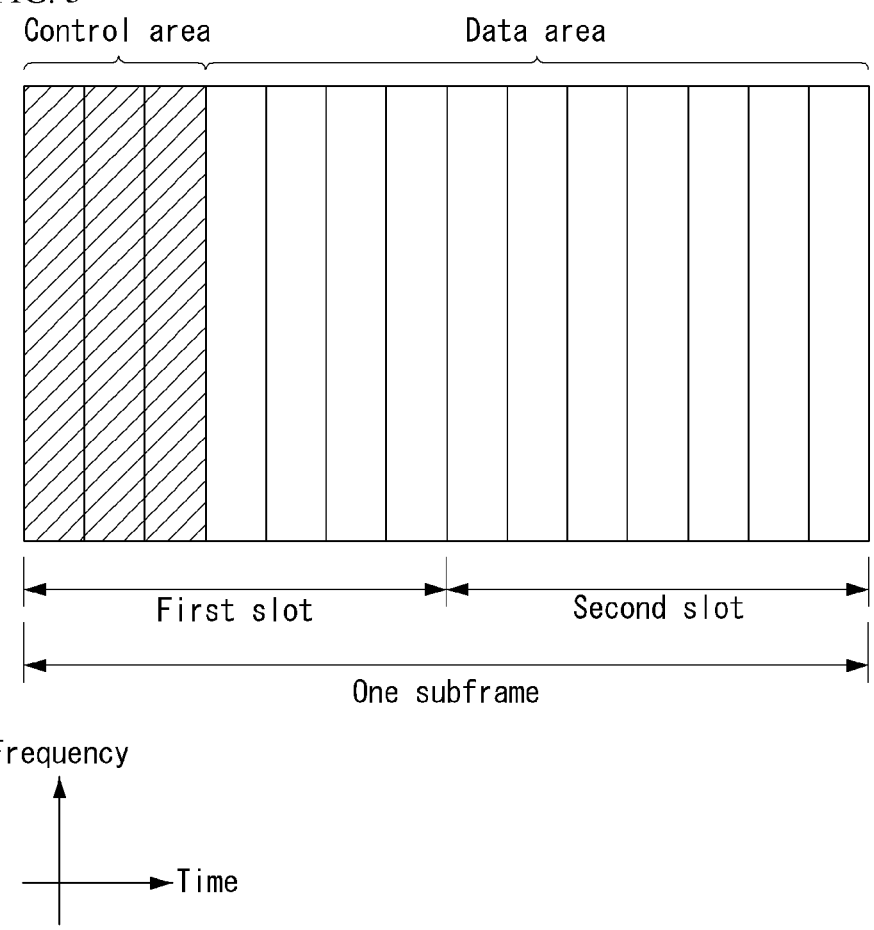
FIG. 3 is a diagram illustrating a structure of downlink subframe in a wireless communication system to which the present disclosure may be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIGS. 1A to 1B is merely one example, and the number of subcarriers included in the radio frame or the number of slots included in a subframe or the number of OFDM symbols included in a slot may be changed in various manners.

Figure 2:
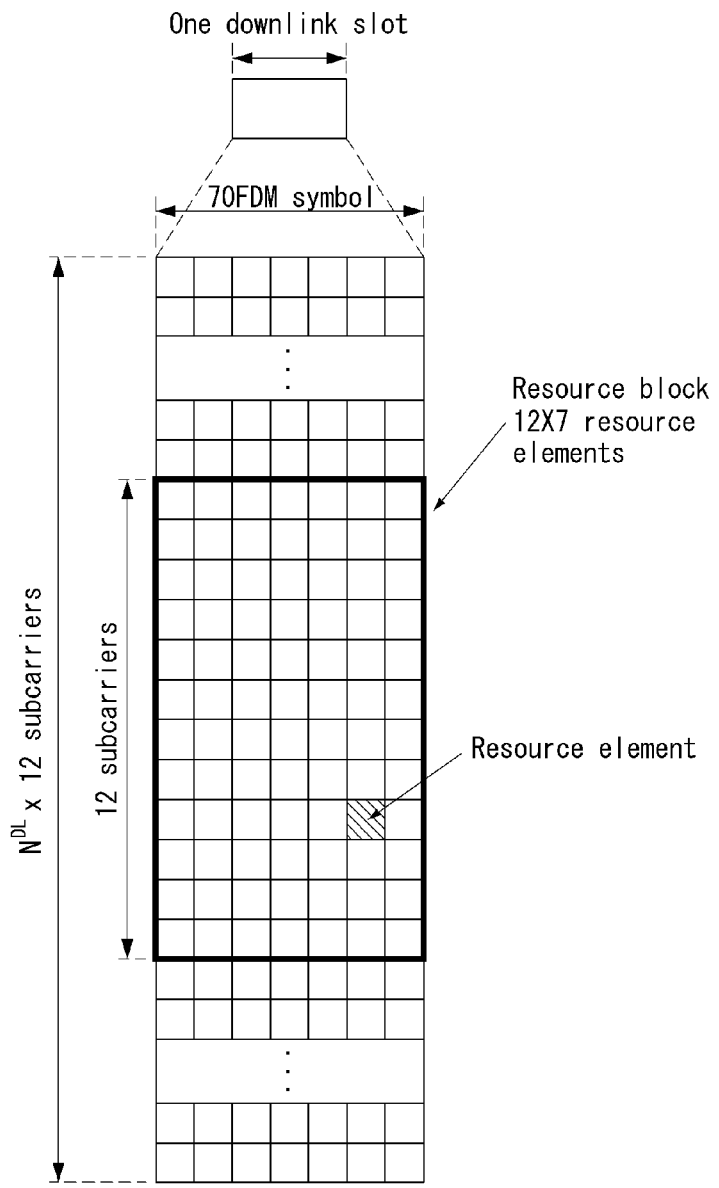
FIG. 2 is a diagram illustrating a resource grid for a downlink slot in a wireless communication system to which the present disclosure may be applied.

FIG. 2 is a diagram illustrating a resource grid for one downlink slot in the wireless communication system to which the present disclosure can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present disclosure is not limited thereto.

Each element on the resource grid is referred to as a resource element and one resource block includes 12×7 resource elements. The number of resource blocks included in the downlink slot, $N^{DL}$ is subordinated to a downlink transmission bandwidth.

A structure of the uplink slot may be the same as that of the downlink slot.

FIG. 3 illustrates a structure of a downlink subframe in the wireless communication system to which the present disclosure can be applied.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

PDCCH (Physical Downlink Control Channel)

Hereinafter, a PDCCH will be described in detail.

The control information transmitted via the PDCCH is referred to as downlink control information (DCI). The size and use of control information transmitted via the PDCCH may be changed according to DCI format or the size of control information may be changed according to coding rate.

Table 3 shows the DCI according to DCI format

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Referring to Table 3 above, the DCI format includes format 0 for scheduling of a PUSCH, format 1 for scheduling of one PDSCH codeword, format 1A for compact scheduling of one PDSCH codeword, format 1c for very compact scheduling of a DL-SCH, format 2 for PDSCH scheduling in a closed-loop spatial multiplexing mode, format 2A for PDSCH scheduling in an open-loop spatial multiplexing mode, formats 3 and 3A for transmission of a transmission power control (TPC) command for an uplink channel, and format 4 for PUSCH scheduling in a uplink cell in a multiple antenna port transmission mode.

DCI format 1A may be used for PDSCH scheduling regardless of the transmission mode of the UE.

Such DCI format is independently applicable per UE and PDCCHs of several UEs may be multiplexed within one subframe. The PDCCH is composed of an aggregate of one or several control channel elements (CCEs). The CCE is a logical allocation unit used to provide a PDCCH with a coding rate according to radio channel state. The CCE refers to a unit corresponding to 9 sets of REGs composed of four resource elements. The BS may use {1, 2, 4, 8} CCEs in order to configure one PDCCH signal and {1, 2, 4, 8} is referred to as a CCE aggregation level.

The number of CCEs used to transmit a specific PDCCH is determined by the BS according to channel state. The PDCCH configured according to UE is interleaved and mapped to a control channel region of each subframe by a CCE-to-RE mapping rule. The location of the PDCCH may depend on the number of OFDM symbols for a control channel of each subframe, the number of PHICH groups, transmit antenna, frequency shift, etc.

As described above, channel coding is performed independent of the multiplexed PDCCHs of the UEs and cyclic redundancy check (CRC) is applied. A unique identifier (UE ID) of each UE is masked to the CRC such that the UE receives the PDCCH thereof. However, in the control region allocated within the subframe, the BS does not provide the UE with information about where the PDCCH of the UE is located. Since the UE does not know the location of the PDCCH thereof and at which CCE aggregation level or with which DCI format the PDCCH thereof is transmitted, the UE monitors a set of PDCCH candidates within the subframe to detect the PDCCH thereof, in order to receive the control channel from the BS. This is referred to as blind decoding (BD).

The BD may also be referred to as blind detection or blind detect. The BD refers to a method of, at a UE, de-masking a UE ID thereof in a CRC portion, checking CRC errors, and determining whether a PDCCH is a control channel thereof.

Hereinafter, the information transmitted by DCI format 0 will be described.

DCI format 0 is used for PUSCH scheduling in one uplink cell.

Table 4 represents the information transmitted through DCI format 0

TABLE 4

| Format 0 (Release 8) | Format 0 (Release 10) |
| --- | --- |
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) |
|  | SRS request |
|  | Resource allocation type (RAT) |

Referring to Table 4 above, the following information is transmitted through DCI format 0.

1) Carrier indicator, which has a length of 0 or 3 bits.

2) Flag for DCI format 0 and DCI format 1A differentiation, which has a length of 1 bit, and 0 indicates DCI format 0 and 1 indicates DCI format 1A 3) Frequency hopping flag, which has 1 bit. This field may used for the multi-cluster allocation for the Most Significant bit (MSB) of the corresponding resource allocation if it is required.

4) Resource block assignment and hopping resource allocation, which has $\lceil \log_2 (N_{RB}^{DL}(N_{RB}^{DL}+1)/2) \rceil$ bit.

Herein, in the case of PUSCH hopping in a single-cluster allocation, in order to acquire the value of $\tilde{n}_{PRB}(i)$, the most significant bits (MSBs) of NUL_hop number are used. $(\lceil \log_2(N_{RB}^{UL}(N_{RB}^{UL}+1)/2) \rceil - N_{UL\_hop})$ bit provides the resource allocation of the first slot in the uplink subframe. In addition, in the case that there is no PUSCH hopping in the single-cluster allocation, $(\lceil \log_2(N_{RB}^{UL}(N_{RB}^{UL}+1)/2) \rceil)$ bit provides the resource allocation in the uplink subframe. In addition, in the case that there is no PUSCH hopping in a multi-cluster allocation, the resource allocation information is obtained from the concatenation between the frequency hopping flag field and the hopping resource allocation field of the resource block allocation, and ($\lceil \log_2(N_{RB}^{UL}(N_{RB}^{UL}+1)/2) \rceil$) bit provides the resource allocation in the uplink subframe. In this case, value of P is determined by the number of downlink resource blocks.

5) Modulation and coding scheme (MCS), which has a length of 1 bit.

6) New data indicator, which has a length of 2 bits.

7) Transmit Power Control (TPC) command for PUSCH, which has a length of 2 bits.

8) Cyclic shift (CS) for a demodulation reference signal (DMRS) and an index of orthogonal cover/orthogonal cover code (OC/OCC), which has 3 bits.

9) Uplink index, which has a length of 2 bits. This field exits only for the TDD operation according to uplink-downlink configuration 0.

10) Downlink Assignment Index (DAI), which has a length of 2 bits. This field exits only for the TDD operation according to uplink-downlink configurations 1-6.

11) Channel State Information (CSI) request, which has a length of 1 bit or 2 bits. Herein, the field of 2 bits is applied only to the case that the corresponding DCI is mapped to the UE to which one or more downlink cells are configured by the Cell-RNTI (C-RNTI) in a UE-specific manner.

12) Sounding Reference Signal (SRS) request, which has a length of 0 bit or 1 bit. Herein, this field exists only in the case that the scheduling PUSCH is mapped by the C-RNTI in the UE-specific manner.

13) Resource allocation type, which has a length of 1 bit.

In the case that the number of information bits in DCI format 0 is smaller than the payload size (including additional padding bits) of DCI format 1A, 0 is added in order that DCI format 1A becomes identical to DCI format 0.

Figure 4:
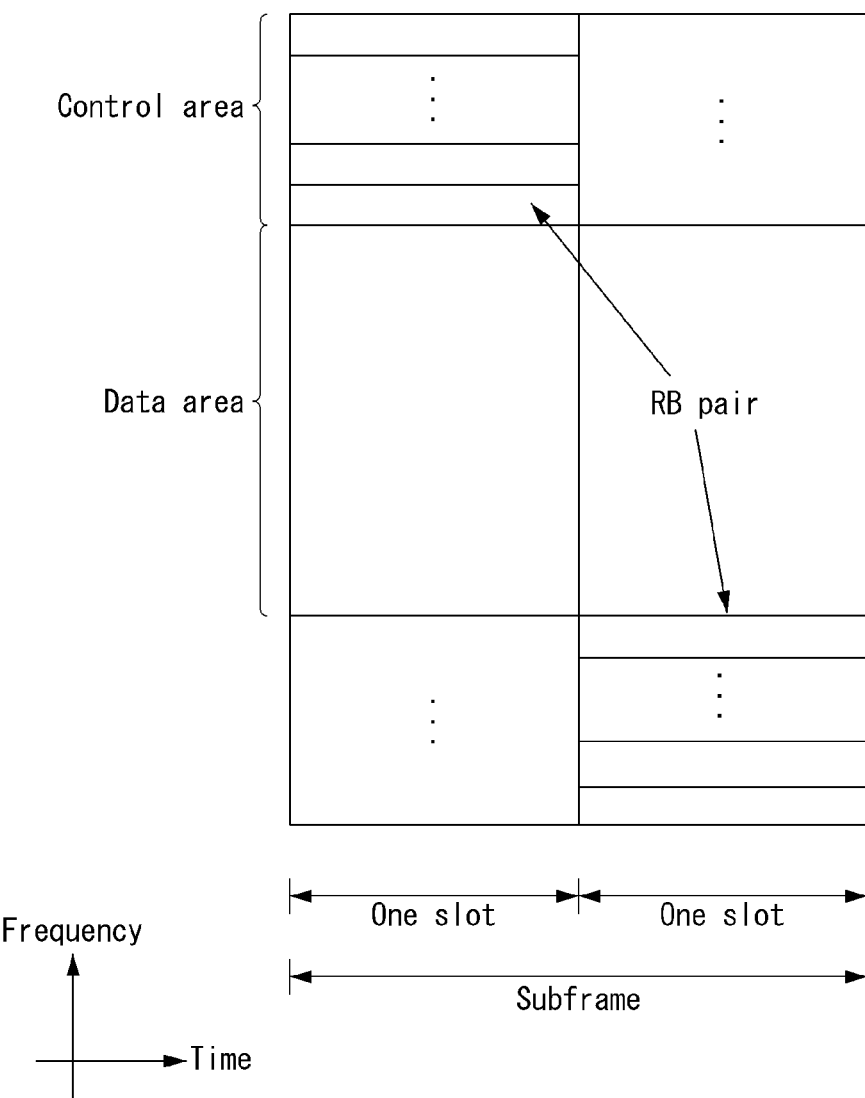
FIG. 4 is a diagram illustrating a structure of uplink subframe in a wireless communication system to which the present disclosure may be applied.

FIG. 4 illustrates a structure of an uplink subframe in the wireless communication system to which the present disclosure can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 5 given below

TABLE 5

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

Figure 5:
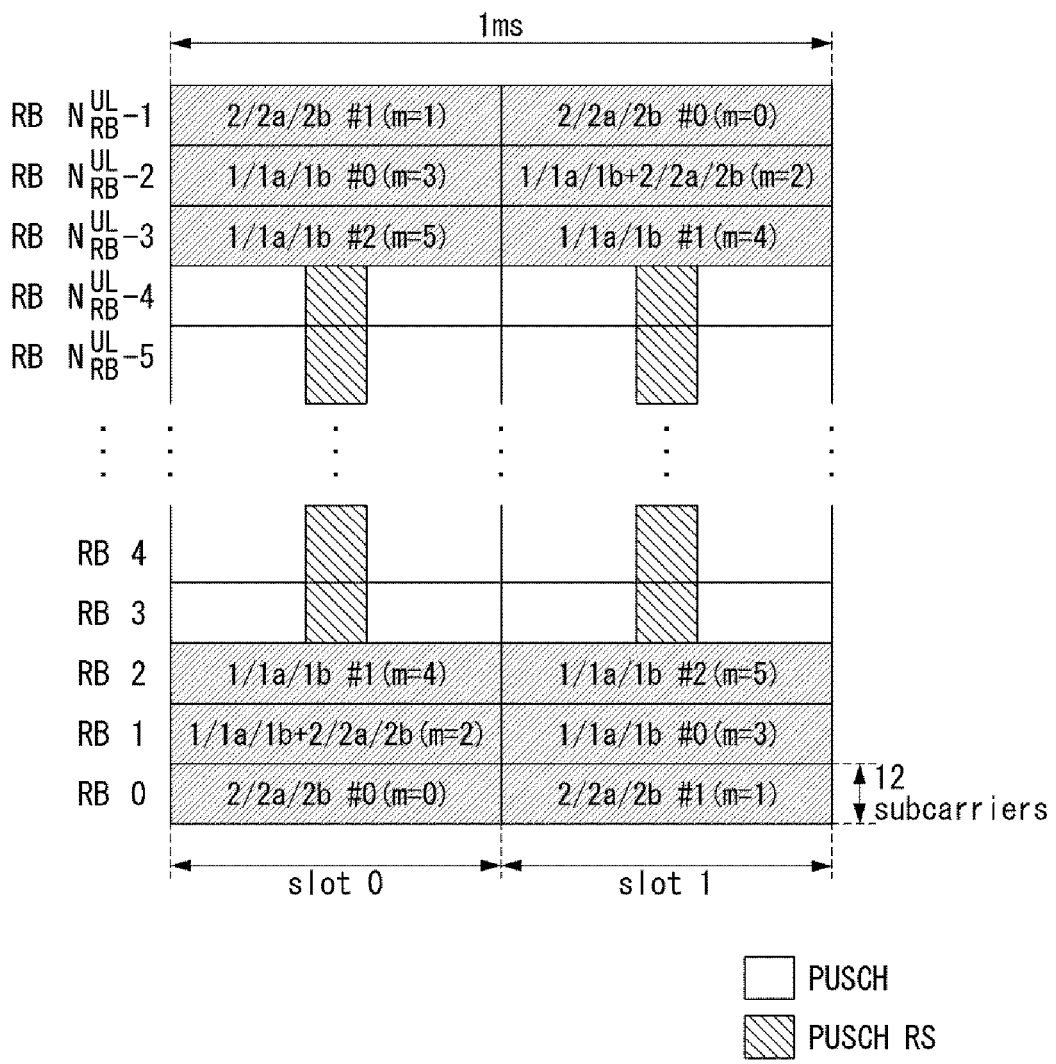
FIG. 5 is a diagram illustrating an example of the shape in which PUCCH formats are mapped to the PUCCH region of uplink physical resource block in a wireless communication system to which the present disclosure may be applied.

FIG. 5 a diagram illustrating one example of a type in which PUCCH formats are mapped to a PUCCH region of an uplink physical resource block in the wireless communication system to which the present disclosure can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
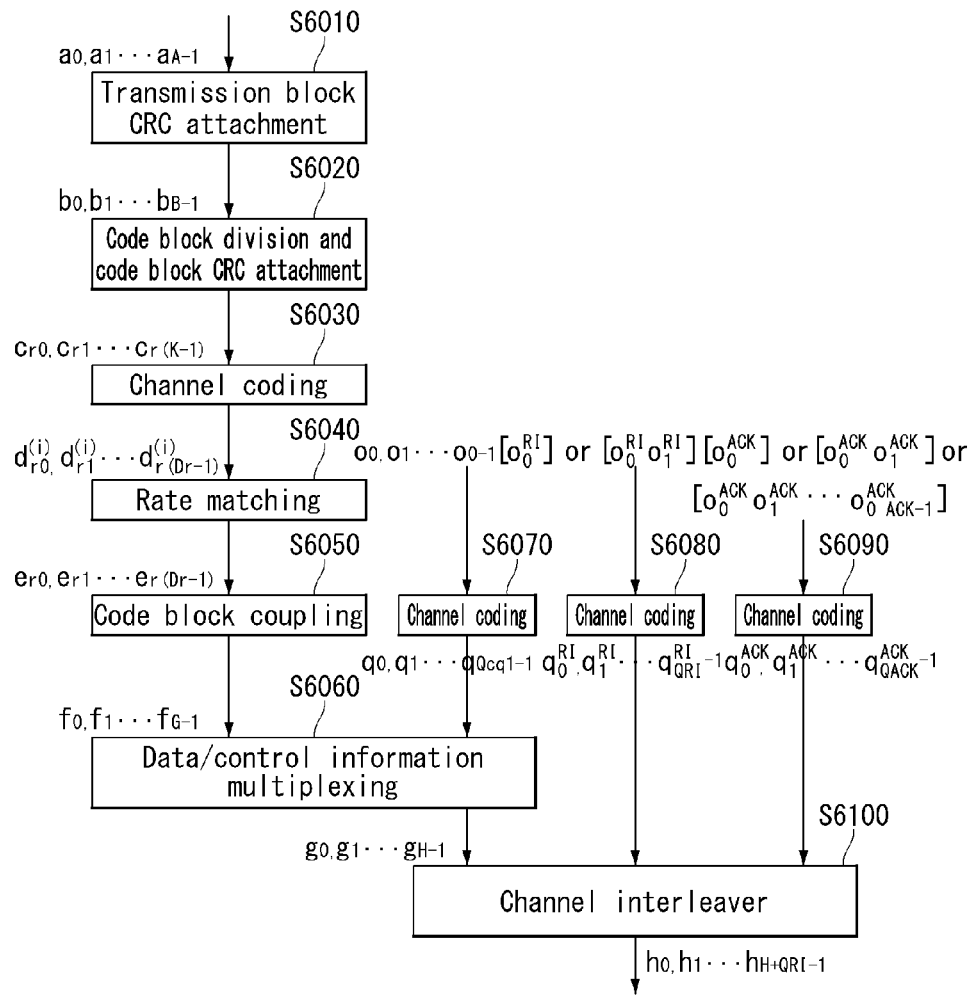
FIG. 6 is a diagram illustrating an example of a signal processing procedure of an uplink shared channel, which is a transport channel in a wireless communication system to which the present disclosure may be applied.

FIG. 6 is a diagram illustrating an example of a signal processing process of an uplink shared channel, which is a transport channel in a wireless communication system to which the present disclosure may be applied.

Hereinafter, a signal processing process of an uplink shared channel (hereinafter, referred to as "UL-SCH") may be applied to one or more transport channels or control information types.

Referring to FIG. 6, the UL-SCH transmits data to a coding unit in the form of a transport block (TB) once every transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block received from a higher layer (S6010). In this case, A is a size of the transport block, and L is the number of parity bits. Input bits to which the CRC is attached are $b_0, b_1, b_2, b_3, \ldots, b_{B-1}$. In this case, B represents the number of bits of the transport block including the CRC.

$b_0, b_1, b_2, b_3, \ldots, b_{B-1}$ are segmented into a plurality of code blocks (CBs) according to a TB size, and CRCs are attached to the plurality of divided CBs (S6020). After code block segmentation and CRC attachment, bits are $c_{r0}, c_{r1}, c_{r2}, c_{r3}, \ldots, c_{r(K_r-1)}$. Here, r is the number ($r=0, \ldots, C-1$) of code blocks, and Kr is the number of bits according to a code block r. Further, C represents the total number of code blocks.

Thereafter, channel coding is performed (S6030). Output bits after channel coding are $d_{r0}^{(i)}, d_{r1}^{(i)}, d_{r2}^{(i)}, d_{r3}^{(i)}, \ldots, d_{r(D_r-1)}^{(i)}$. In this case, i is an encoded stream index and may have a value of 0, 1, or 2. Dr represents the number of bits of i-th coded stream for the code block r. r is a code block number ($r=0, \ldots, C-1$), and C represents the total number of code blocks. Each code block may be encoded by each turbo coding.

Thereafter, rate matching is performed (S6040). Bits after rate matching are $e_{r0}, e_{r1}, e_{r2}, e_{r3}, \ldots, e_{r(E_r-1)}$. In this case, r is the number ($r=0, \ldots, C-1$) of code blocks, and C represents the total number of code blocks. Er represents the number of rate matched bits of the r-th code block.

Thereafter, concatenation between code blocks is performed again (S6050). After concatenation of code blocks is performed, bits are $f_0, f_1, f_2, f_3, \ldots, f_{G-1}$. In this case, G represents the total number of encoded bits for transmission, and when control information is multiplexed with UL-SCH transmission, the number of bits used for transmission of control information is not included.

When control information is transmitted in the PUSCH, channel coding is independently performed in the control information CQI/PMI, RI, and ACK/NACK (S6070, S6080, and S6090). Because different coded symbols are allocated for transmission of each control information, each control information has a different coding rate.

In time division duplex (TDD), as an ACK/NACK feedback mode, two modes of ACK/NACK bundling and ACK/NACK multiplexing by a higher layer configuration are supported. For ACK/NACK bundling, an ACK/NACK information bit is configured with 1 bit or 2 bits, and for ACK/NACK multiplexing, an ACK/NACK information bit is configured with 1 to 4 bits.

After a concatenation step between code blocks at step S134, multiplexing of encoded bits $f_0, f_1, f_2, f_3, \ldots, f_{G-1}$ of UL-SCH data and encoded bits $q_0, q_1, q_2, q_3, \ldots, q_{N_L Q_{CQI}-1}$ of CQI/PMI is performed (S12060). A multiplexed result of data and CQI/PMI is $g_0, g_1, g_2, g_3, \ldots, g_{H'-1}$. In this case, $g_i$ ($i=0, \ldots, H'-1$) denotes a column vector having a ($Q_m \cdot N_L$) length. $H=(G+N_L \cdot Q_{CQI})$ and $H'=H/(N_L \cdot Q_m)$. $N_L$ denotes the number of layers to which the UL-SCH transport block is mapped, and H denotes the total number of encoded bits allocated for UL-SCH data and CQI/PMI information in the $N_L$ number of transport layers to which the transport block is mapped.

Thereafter, the multiplexed data, CQI/PMI, separately channel-coded RI, and ACK/NACK are channel interleaved to generate an output signal (S6100).

MIMO(Multi-Input Multi-Output)

MIMO technology uses multiple transmitting (Tx) antennas and multiple receiving (Rx) antennas, away from those which have been generally used one transmit antenna and one receive antenna. In other words, MIMO technology is technology for increasing a capacity or improving a performance by using multiple input/output antennas at a transmitting end or a receiving end of a wireless communication system. Hereinafter, "MIMO" will be referred to as "multi-input/output antenna".

More specifically, multi-input/output antenna technology does not rely on one antenna path so as to receive one total message, and collects a plurality of pieces of data received through several antennas to complete total data. As a result, MIMO technology may increase a data rate within a specific system range and also increase a system range through a specific data rate.

Next-generation mobile communication requires much higher data rates than conventional mobile communication and thus it is expected that efficient MIMO technology is always required. In such a situation, MIMO communication technology is next generation mobile communication technology that can be widely used in mobile communication UEs and repeaters, and due to expansion of data communication, it is attracting attention as a technology that can overcome the transmission limit of other mobile communication according to a limit situation.

Among various transmission efficiency improvement technologies currently being studied, MIMO technology is currently receiving the most attention as a method of dramatically improving a communication capacity and a transmission/reception performance without additional frequency allocation or power increase.

Demodulation Reference Signal for PUSCH

A reference signal sequence r(m) for generating an uplink DMRS is generated by Equation 1 when transform precoding for a PUSCH is not allowed.

In this case, an example of a case in which transform precoding for a PUSCH is not allowed may be a case of generating a transmission signal of a CP-OFDM scheme.

$$r(m) = \frac{1}{\sqrt{2}}(1 - 2 \cdot c(2m)) + j\frac{1}{\sqrt{2}}(1 - 2 \cdot c(2m+1))$$ [Equation 1]

Here, c(i) means the pseudo-random sequence.

When a transmission precoder for the PUSCH is allowed, a reference signal sequence r(m) may be generated by Equation 2.

$$r^{(p)}(m) = r_{u,v}^{(\alpha)}(m)$$ [Equation 2]

Figure 7:
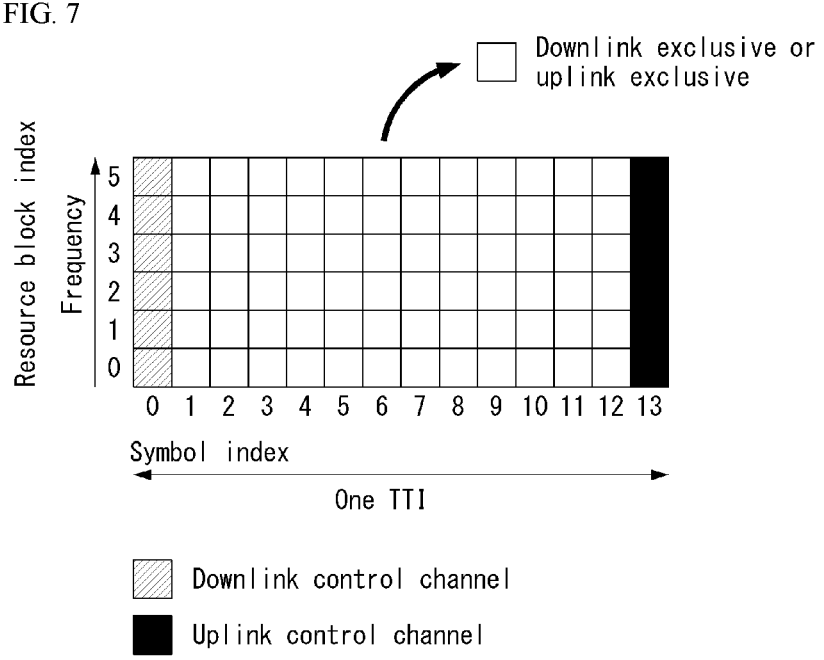
FIG. 7 illustrates an example of a self-contained subframe structure to which a method proposed in the present disclosure may be applied.
Figure 8:
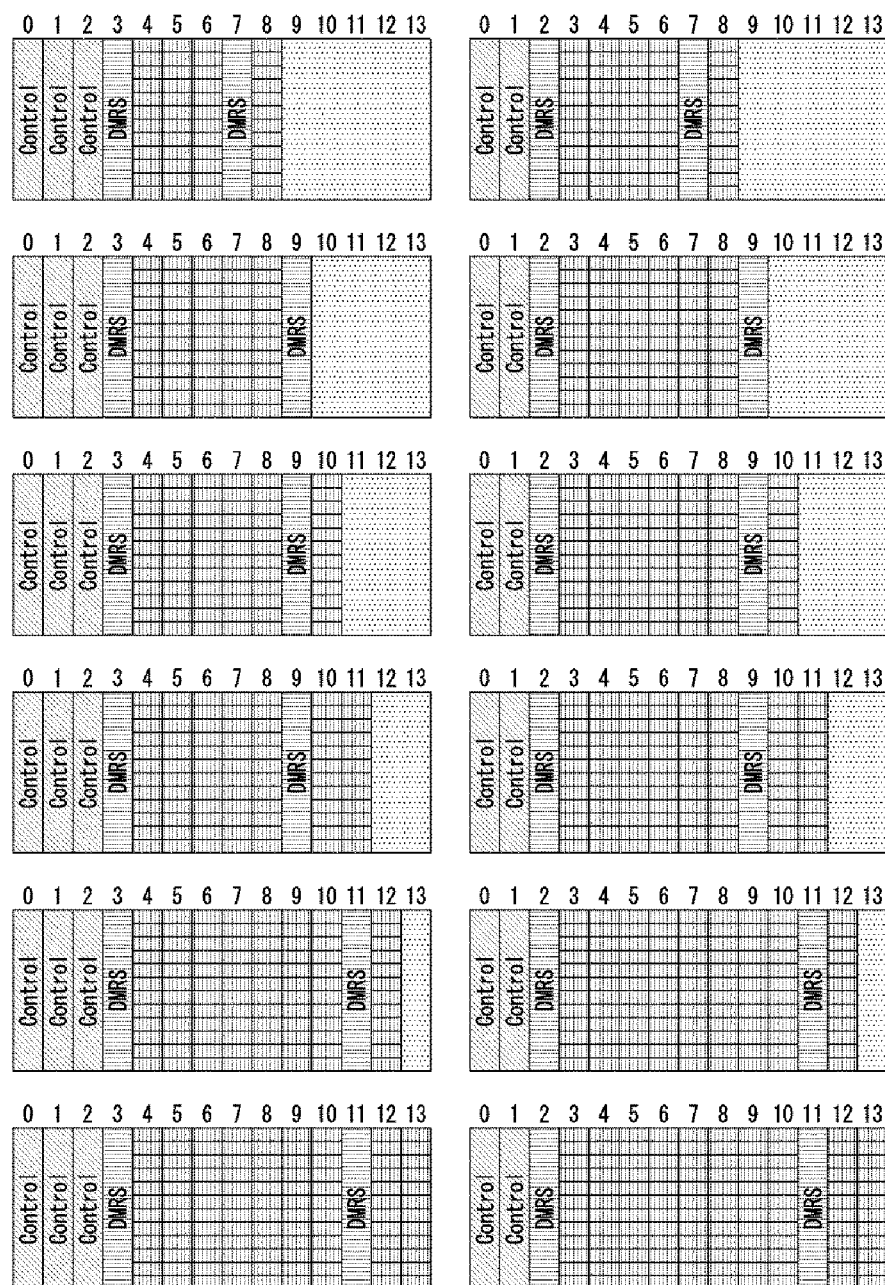
FIGS. 8 to 10B are diagrams illustrating an example of a method of mapping a DMRS to which the present disclosure may be applied.

A DMRS of the generated PUSCH is mapped to a physical resource according to Type 1 or 2 given by higher layer parameters, as illustrated in FIGS. 7 and 8.

In this case, the DMRS may be mapped to a single symbol or a double symbol according to the number of antenna ports.

When transform precoding is not allowed, a reference signal sequence r(m) may be mapped to a physical resource by Equation 3.

$$a_{k,l}^{(p,\mu)} = \beta_{DMRS} w_f(k') \cdot w_t(l') \cdot r(2m + k' + m_0)$$ [Equation 3]

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \{l_0, \bar{l}\} + l'$$

When transform precoding is allowed, the reference signal sequence r(m) may be mapped to a physical resource by Equation 4.

$$a_{k,l}^{(p,\mu)} = \beta_{DMRS} w_f(k') \cdot w_t(l') \cdot r(2m + k' + m_0)$$ [Equation 4]

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \{l_0, \bar{l}\} + l'$$

In Equations 3 and 4, $w_f(k')$, $w_t(l')$, and $\Delta$ are given by Tables 6 and 7.

A reference point for k is a bandwidth part in which a PUSCH is transmitted, and $k_0$ is a subcarrier of the lowest number of carrier resource blocks allocated for PUSCH transmission.

Quantity $m_0$ is the subcarrier difference between $k_0$ and a subcarrier 0 in a carrier resource block 0.

Reference points for l and $l_0$ of a first DMRS symbol may vary depending on a mapping type.

PUSCH mapping type A:

l may be defined relative to the start of the slot.

When the higher layer parameter UL-DMRS-typeA-pos is equal to 3, $l_0$ is 3, otherwise $l_0$ is 2.

PUSCH mapping type B:

l may be defined relative to the start of the scheduled PUSCH resources.

$l_0$ is 0.

Locations of additional DMRS symbols may be given by a last OFDM symbol used for the PUSCH in the slot according to l' and Tables 8 and 9.

A time domain index l' and supported antenna ports p may be given by Table 10. However, when a higher layer parameter UL-DMRS-len is '1', a single symbol DMRS may be used.

When a higher layer parameter UL-DMRS-len is 2, a single symbol or a double symbol DMRS may be determined by associated DCI.

TABLE 6

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

TABLE 7

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

TABLE 8

| Position of last PUSCH symbol | Additional DM-RS position $\bar{l}$ | | | | | | | |
|---|---|---|---|---|---|---|---|---|
| | PUSCH mapping type A UL-DMRS-add-pos | | | | PUSCH mapping type B UL-DMRS-add-pos | | | |
| | 0 | 1 | 2 | 3 | 0 | 1 | 2 | 3 |
| ≤7 | — | | | | — | | | |
| 8 | — | 7 | | | | | | |
| 9 | — | 9 | 6, 9 | | | | | |
| 10 | — | 9 | 6, 9 | | | | | |
| 11 | — | 9 | 6, 9 | 5, 8, 11 | — | | | |
| 12 | — | 11 | 7, 11 | 5, 8, 11 | — | | | |
| 13 | — | 11 | 7, 11 | 5, 8, 11 | — | | | |

TABLE 9

| Position of last PUSCH symbol | Additional DM-RS positions $\bar{l}$ | | | | | | | |
|---|---|---|---|---|---|---|---|---|
| | PUSCH mapping type A UL-DMRS-add-pos | | | | PUSCH mapping type B UL-DMRS-add-pos | | | |
| | 0 | 1 | 2 | 3 | 0 | 1 | 2 | 3 |
| ≤7 | — | | | | — | | | |
| 8 | — | | | | | | | |
| 9 | — | 8 | | | | | | |
| 10 | — | 8 | | | | | | |
| 11 | — | 8 | | | | | | |
| 12 | — | 10 | | | | | | |
| 13 | — | 10 | | | | | | |

TABLE 10

| DM-RS duration | UL-DMRS-add-pos | l' | Supported antenna ports p | |
|---|---|---|---|---|
| | | | Configuration type 1 | Configuration type 2 |
| single-symbol DM-RS | 0, 1, 2, 3 | 0 | 1000-1003 | 1000-1005 |
| double-symbol DM-RS | 0 | 0, 1 | 1000-1007 | 1000-1011 |

Demodulation Reference Signals for PDSCH

A reference signal sequence r(m) for generating a downlink DMRS is generated by Equation 5.

$$r(m) = \frac{1}{\sqrt{2}}(1 - 2 \cdot c(2m)) + j\frac{1}{\sqrt{2}}(1 - 2 \cdot c(2m+1))$$ [Equation 5]

Here, c(i) means the pseudo-random sequence.

A DMRS of the generated PDSCH is mapped to a physical resource according to a type 1 or 2 given by a higher layer parameter.

In this case, the reference signal sequence r(m) may be mapped to a physical resource by Equation 6.

$$a_{k,l}^{(p,\mu)} = \beta_{DMRS} w_f(k') \cdot w_t(l') \cdot r(2m + k' + m_0)$$ [Equation 6]

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \{l_0, \bar{l}\} + l'$$

In Equation 5, l is defined relative to the start of a slot, and $w_f(k')$, $w_t(l')$, and $\Delta$ are given by Tables 11 and 12.

A reference point for k is a bandwidth part in which a PDSCH is transmitted, and $k_0$ is a subcarrier of the lowest number of carrier resource blocks allocated for PDSCH transmission.

Quantity $m_0$ is the subcarrier difference between $k_0$ and subcarrier 0 in a carrier resource block 0.

Reference points for l and $l_0$ of a first DMRS symbol may vary depending on a mapping type.

PDSCH mapping type A:

l may be defined relative to the start of the slot.

If the higher layer parameter DL-DMRS-typeA-pos is equal to 3, $l_0$ is 3, otherwise $l_0$ is 2.

PDSCH mapping type B:

l may be defined relative to the start of the scheduled PDSCH resources.

$l_0$ is 0.

Locations of additional DMRS symbols may be given by a last OFDM symbol used for the PUSCH in a slot according to l' and Tables 13 and 14.

A time domain index l' and supported antenna ports p may be given by Table 15.

When the higher layer parameter DL-DMRS-len is 1, a single symbol DMRS may be used.

When the higher layer parameter DL-DMRS-len is 2, a single symbol or a double symbol DMRS may be determined by associated DCI.

TABLE 11

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

TABLE 12

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

TABLE 13

Additional DM-RS positions Ī

| Position of last PDSCH symbol | PDSCH mapping type A DL-DMRS-add-pos | | | | PDSCH mapping type B DL-DMRS-add-pos | | | |
|---|---|---|---|---|---|---|---|---|
| | 0 | 1 | 2 | 3 | 0 | 1 | 2 | 3 |
| ≤7 | — | | | | — | | | |
| 8 | — | 7 | | | — | | | |
| 9 | — | 9 | 6, 9 | | — | | | |
| 10 | — | 9 | 6, 9 | | — | | | |
| 11 | — | 9 | 6, 9 | 5, 8, 11 | — | | | |
| 12 | — | 11 | 7, 11 | 5, 8, 11 | — | | | |
| 13 | — | 11 | 7, 11 | 5, 8, 11 | — | | | |

TABLE 14

Additional DM-RS positions Ī

| Position of last PDSCH symbol | PDSCH mapping type A DL-DMRS-add-pos | | | PDSCH mapping type B DL-DMRS-add-pos | | |
|---|---|---|---|---|---|---|
| | 0 | 1 | 2 | 0 | 1 | 2 |
| ≤7 | — | | | — | | |
| 8 | — | | | — | | |
| 9 | — | 8 | | — | | |
| 10 | — | 8 | | — | | |
| 11 | — | 8 | | — | | |
| 12 | — | 10 | | — | | |
| 13 | — | 10 | | — | | |

TABLE 15

| Single or double symbol DM-RS | l' | Supported antenna ports p | |
|---|---|---|---|
| | | Configuration type 1 | Configuration type 2 |
| single | 0 | 1000-1003 | 1000-1005 |
| double | 0, 1 | 1000-1007 | 1000-1011 |

Procedure of UE for Receiving PDSCH

When the UE detects a PDCCH having the configured DCI format, the UE should decode the corresponding PDSCH as indicated by the corresponding DCI.

When the UE is configured to decode the PDCCH with the CRC scrambled with C-RNTI, the UE should decode the PDCCH and the corresponding PDSCH. Scramble initialization of these PDSCHs is determined by C-RNTI.

The UE may derive the DMRS type for the PDSCH from the configured CP type and DL-DMRS-config-type, which is a higher layer parameter indicating a configuration type of the DMRS, as illustrated in Table 16.

TABLE 16

| Value of the DL-DMRS-config-type | CP type | DM-RS type |
|---|---|---|
| Not available | Normal | Type 1 |
| Type 1 | Normal | Type 1 |
| Type 2 | Normal | Type 2 |
| Not available | Extended | Type 1 |
| Type 1 | Extended | Type 1 |
| Type 2 | Extended | Not applicable |

When the UE is configured with an additional DMRS for the PDSCH by higher layer parameters, multiple DMRS symbols may be transmitted.

The UE may assume that a DMRS port configured with higher layer parameters is quasi co-located (QCL) for delay spread, Doppler spread, Doppler shift, average gain, average delay, and spatial RX parameters.

When the UE is configured with a higher parameter of 'DL-PTRS-present', the UE may assume that the presence and pattern of a phase tracking reference signal (PTRS) antenna port are a function of a corresponding scheduled MCS and a scheduled bandwidth.

When the UE is configured with higher layer parameters 'dmrs-group2' and 'DL-PTRS-present', the UE may assume that a PTRS antenna port number is related to DMRS antenna ports indicated in a 'dmrs-group 2' configuration for TBD of the associated parameters.

When the UE is configured with the higher layer parameters DL-PTRS-present and dmrs-group2, the PT-RS port may be related to a DM-RS antenna port of the lowest index among the configured DM-RS antenna ports indicated in the dmrs-group2 configuration for the PDSCH.

FIG. 7 is a diagram illustrating a self-contained subframe structure in a wireless communication system in which the present disclosure may be applied.

In order to minimize data transmission latency in a TDD system, fifth generation (5G) new RAT considers a self-contained subframe structure, as illustrated in FIG. 4.

In FIG. 7, a hatched area (symbol index 0) represents a downlink (DL) control area, and a black portion (symbol index 13) represents an uplink (UL) control area. An area having no shaded display may be used for DL data transmission or may be used for UL data transmission. A characteristic of such a structure is that DL transmission and UL transmission proceed sequentially in one subframe and thus DL data may be transmitted in a subframe, and UL ACK/NACK may also be received. As a result, in case of a data transmission error, the time required for data retransmission is reduced, thereby minimizing latency of final data transmission.

In such a self-contained subframe structure, a time gap is required for a process in which the base station and the UE switch from a transmission mode to a reception mode or switch from a reception mode to a transmission mode. For this reason, some OFDM symbols at the time of switching from DL to UL in a self-contained subframe structure are set to a guard period (GP).

FIG. 8 is a diagram illustrating an example of a method of mapping a DMRS to which the present disclosure may be applied.

Referring to FIG. 8, locations in which a front-load DMRS and an additional DMRS are mapped to a second DMRS may be variable.

Specifically, when the subframe has an OFDM symbol for another purpose other than the OFDM symbol for downlink data transmission in one subframe (or slot), as in a self-contained subframe structure illustrated in FIG. 7, whether to set the additional DMRS and a position thereof may be determined according to a structure of the subframe.

For example, when the structure of the subframe is seven symbol slots, an additional DMRS is not transmitted and only a front-load DMRS may be supported, and when the structure of the subframe is configured with 14 symbol slots, only the front-load DMRS may be supported or both a front-load DMRS and an additional DMRS may be supported.

Specifically, a location of a time axis OFDM symbol to which additional DMRSs are mapped may be determined according to at least one of a configuration of a DL/UL slot, a slot type, or a slot structure.

That is, as illustrated in FIG. 8, in the self-contained subframe structure, additional DMRSs may have different locations of OFDM symbols mapped according to a guard segment and an area of the PUSCH.

For example, in the case of a self-contained subframe, a subframe structure may vary according to a guard segment and PUCCH and PUSCH segments.

In this way, when the structure of the subframe is changed, in interpolation of channels in a time domain, when a time axis location of the additional DMRS is set to the same location irrespective of the subframe structure, a segment of extrapolation is extended and thus a channel estimation performance may be degraded.

Therefore, in order to estimate a changing channel in the time domain, an additional DMRS may be variably mapped to an OFDM symbol according to the structure of a subframe.

FIG. 9A to D illustrate an example of a pattern of a DMRS proposed in the present disclosure.

Referring to FIGS. 9A to 9D, a DMRS for estimating a channel may be mapped to one symbol or two symbols according to the number of antenna pods.

Figure 9A:
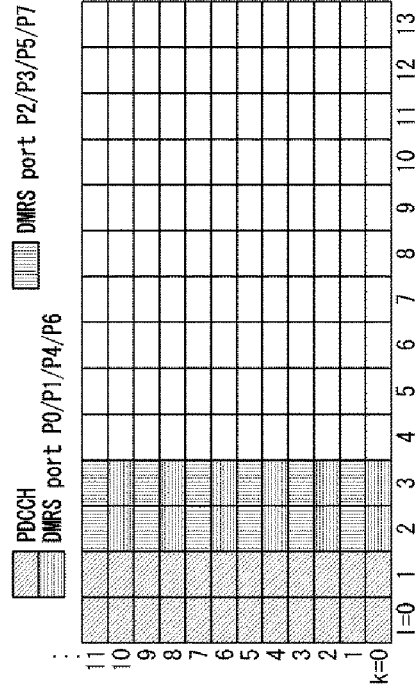
Figure 9B:
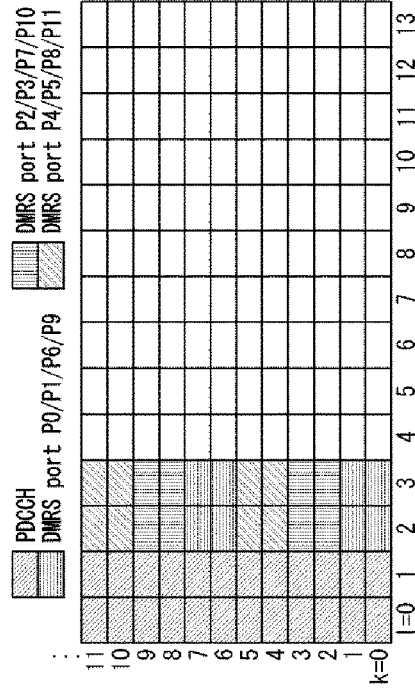
Figure 9C:
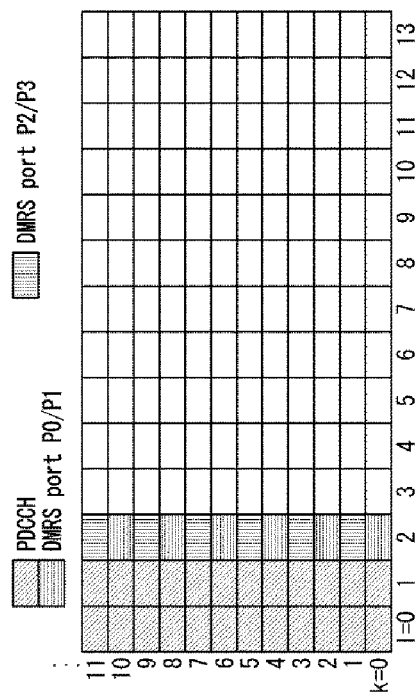
Figure 9D:
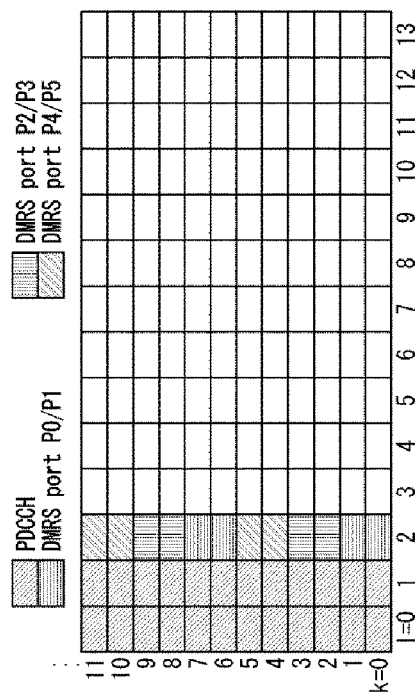

Specifically, an uplink DMRS and a downlink DMRS may be generated by the following method and mapped to resource areas. FIGS. 9(a) and 9(b) illustrate an example of an uplink or downlink DMRS mapped to a physical resource according to a type 1, and FIGS. 9(c) and 9(d) illustrate an example of an uplink or downlink DMRS mapped to a physical resource according to a type 2.

A DMRS for demodulating uplink data or downlink data is generated by mapping a demodulation reference sequence to an OFDM symbol.

The DMRS sequence may be mapped to one or two OFDM symbols according to a mapping type, as illustrated in FIGS. 18A to 19B, and a CDM scheme may be applied for port multiplexing.

Figure 10A:
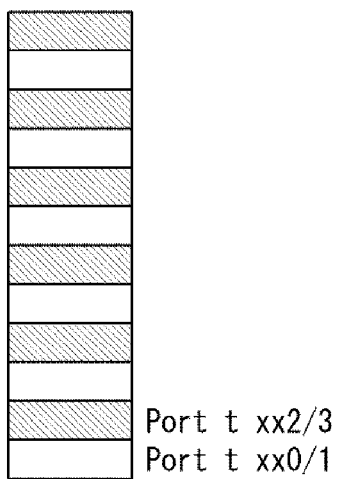
Figure 10B:
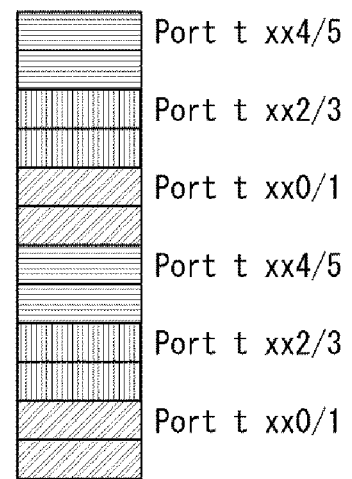

FIGS. 10A to 10B are diagrams illustrating an example of a DMRS port indexing method proposed in the present disclosure.

As illustrated in FIGS. 10A to 10B, DMRS port indexing may vary according to a mapping type of a DMRS.

Specifically, when a mapping type of a DMRS is the above-described type 1, DMRS port indexing is illustrated in FIG. 10A and Table 17.

TABLE 17

| Port indexing | Frequency offset: delta | FD-OCC | |
|---|---|---|---|
| XX0 | 0 | +1 | +1 |
| XX1 | 0 | +1 | −1 |
| XX2 | 1 | +1 | +1 |
| XX3 | 0 | +1 | −1 |

When a mapping type of a DMRS is the above-described type 2, DMRS port indexing is illustrated in FIG. 10B and Table 18.

TABLE 18

| Port indexing | Frequency offset: delta | FD-OCC | |
|---|---|---|---|
| XX0 | 0 | +1 | +1 |
| XX1 | 0 | +1 | −1 |
| XX2 | 2 | +1 | +1 |
| XX3 | 2 | +1 | −1 |

TABLE 18-continued

| Port indexing | Frequency offset: delta | FD-OCC | |
|---|---|---|---|
| XX4 | 4 | +1 | +1 |
| XX5 | 4 | +1 | −1 |

QCL(Quasi-Co Location)

The antenna port is defined so that a channel in which a symbol on the antenna port is carried may be inferred from a channel in which another symbol on the same antenna port is carried. When a property of a channel for carrying a symbol on one antenna port is deduced from a channel for carrying a symbol on another antenna port, it may be regarded that two antenna ports are in a quasi co-located or quasi co-location (QC/QCL) relationship.

Here, the channel characteristics may include one or more of delay spread, Doppler spread, frequency shift, average received power, received timing, and spatial RX parameter. Here, the spatial Rx parameter means a spatial (receiving) channel characteristic parameter such as an angle of arrival.

In order to decode a PDSCH according to a detected PDCCH having intended DCI for the UE and a given serving cell, the UE may be set to a list of the M number of TCI-State configurations in a higher layer parameter PDSCH-Config. The M depends on an UE capability.

Each TCI-State includes a parameter for configuring a quasi co-location relationship between one or two DL reference signals and a DM-RS port of a PDSCH.

The quasi co-location relationship is set to a higher layer parameter qcl-Type1 for a first DL RS and qcl-Type2 (when it is set) for a second DL RS.

In the case of two DL RSs, the QCL type is not the same regardless of whether the reference is the same DL RS or a different DL RS.

The quasi co-location type corresponding to each DL RS is given by a higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, the corresponding NZP CSI-RS antenna ports may be indicated/set to be QCL to a specific TRS from a QCL-Type A viewpoint and a specific SSB from a QCL-Type D viewpoint. The UE, having received such indication/setting may receive the corresponding NZP CSI-RS using Doppler and delay values measured in the QCL-TypeA TRS and apply a reception beam used for receiving a QCL-TypeD SSB to the corresponding NZP CSI-RS reception.

The UE receives an activation command used for mapping up to eight TCI states to a codepoint of DCI field 'Transmission Configuration Indication'.

One of functions of DCI is to transmit scheduling information of a downlink, an uplink, or a side link to the UE. A plurality of DCI formats are defined according to information transmitted to the UE, and in order to transmit specific information, a plurality of DCI formats is defined according to information to be transmitted to a plurality of UEs, and the DCI format defines many fields that transfer specific information.

The base station loads different information to each field of the DCI to transfer the different information to the UE.

The UE may receive a field defined to the DCI format of the PDCCH, decode the field, and receive information related to an operation to be performed by the UE, such as scheduling information.

Accordingly, the UE may perform an operation such as reception of data.

For example, in the case of DCI format 2D, a field (hereinafter, referred to as DCI field 1) meaning information about antenna ports, scrambling identification, and the number of layers, and a field (hereinafter, referred to as DCI field 2) meaning information about PDSCH RE Mapping and Quasi-Co-Location Indicators may be defined.

First, the UE may receive information of the DCI field 1 from the base station to detect information about the number of entire layers using by the base station for data transmission and a port index for transmitting the corresponding data.

By receiving information of the DCI field 2, it is possible to detect the information about the CSI-RS resource in a QCL relationship with ports used for data transmission detected through the DCI field 1.

The CSI-RS resource information may be previously set to the UE through higher layer signaling, and a QCL relationship between a port in which data are transmitted and the CSI-RS resource may be flexibly set to the UE through DCI signaling.

The UE may obtain a value of second statistical information (e.g., delay spread, Doppler spread) of a channel that may help improve a performance in channel estimation for each CSI-RS resource.

Therefore, it is possible to recognize a CSI-RS resource in a QCL relationship with antenna ports set through a DCI field 1 based on the information indicated by a DCI field 2, and by using secondary statistical characteristics of a data transport channel between the base station and the UE based on the CSI-RS resource in the channel estimation step, a channel estimation performance can be improved.

Further, the UE may recognize whether single TRP transmission or double TRP transmission (e.g., Comp (NCJT)) is performed through QCL information indicated by the DCI field 2.

For example, when one CSI-RS resource is indicated, the UE may assume single TRP transmission, and when two CSI-RS resources are indicated, the UE may assume double TRP transmission (i.e., Comp (NCJT)).

When a QCL relationship should be established between antenna ports multiplexed through a CDM method in a frequency domain, a problem may occur in a relationship between the DCI field 1 and the DCI field.

An index of the antenna port related to the number of transmission layers in the DCI field 1 is fixed. In this case, when a QCL relationship is not established between the antenna ports multiplexed by the CDM method in the frequency domain, there is no QCL restriction on a multiplexing scheme and thus different QCL indications (e.g., single TRP transmission/double TRP transmission) is possible through a DCI field 2.

As described above, in NR, DMRSs are classified into a front-load DMRS and an additional DMRS. In order to secure a fast decoding rate, the front-load DMRS defines the DMRS in units of OFDM symbols and may be located at a front symbol among OFDM symbols configuring a PDSCH or a PUSCH.

The additional DMRS may be used for estimating a channel varying to a time domain for time-varying channels due to Doppler spread, Doppler shift, etc. along with the front-load DMRS.

The front-load DMRS may be defined to a 1-symbol front-load DMRS and a 2-symbol front-load DMRS according to the number of configuring OFDM symbols and be set to the UE through higher layer signaling or downlink control information (DCI) signaling.

Further, the additional DMRS may be referred to as a 1-symbol additional DMRS when defined together with the 1-symbol front-load DMRS and as a 2-symbol additional DMRS when defined together with the 2-symbol front-load DMRS.

The number and locations that may be defined for the two additional DMRSs may be defined as illustrated in Tables 17 and 18.

Table 19 illustrates an example of a 1-symbol additional DMRS (starting from the 0th symbol).

TABLE 19

| Position of the last PDSCH | One 1-symbol additional DMRS | Two 1-symbol additional DMRS | Three 1-symbol additional DMRS |
|---|---|---|---|
| $13^{th}$ | $11^{th}$ | $7^{th}, 11^{th}$ | $5^{th}, 8^{th}, 11^{th}$ |
| $12^{th}$ | $11^{th}$ | $7^{th}, 11^{th}$ | $5^{th}, 8^{th}, 11^{th}$ |
| $11^{th}$ | $9^{th}$ | $6^{th}, 9^{th}$ | $5^{th}, 8^{th}, 11^{th}$ |
| $10^{th}$ | $9^{th}$ | $6^{th}, 9^{th}$ | N/A |
| $9^{th}$ | $9^{th}$ | $6^{th}, 9^{th}$ | N/A |
| $8^{th}$ | $7^{th}$ | N/A | N/A |

Table 20 illustrates an example of a 2-symbol additional DMRS (starting from a 0th symbol).

TABLE 20

| Position of the last PDSCH | One 2-symbol additional DMRS | Two 2-symbol additional DMRS | Three 2-symbol additional DMRS |
|---|---|---|---|
| $13^{th}$ | $10^{th}, 11^{th}$ | N/A | N/A |
| $12^{th}$ | $10^{th}, 11^{th}$ | N/A | N/A |
| $11^{th}$ | $8^{th}, 9^{th}$ | N/A | N/A |
| $10^{th}$ | $8^{th}, 9^{th}$ | N/A | N/A |
| $9^{th}$ | $8^{th}, 9^{th}$ | N/A | N/A |
| $8^{th}$ | N/A | N/A | N/A |

In the case of Tables 19 and 20, when the front-load DMRS is located at second and third (starting from the 0th) OFDM symbols in the slot, all thereof may be applied. However, in the case of three 1-symbol additional DMRSs, only when the front-load DMRS is located at the second OFDM symbol in the slot, a DMRS may be set at a position illustrated in Table 17, and when the front-load DMRS is located at the third OFDM symbol, a location of the DMRS is not defined.

Accordingly, the present disclosure proposes a method of setting a location of an additional DMRS according to a location of the front-load DMRS in the case of three 1-symbol additional DMRSs.

Embodiments described hereinafter are merely divided for convenience of description, and some components or characteristics of one embodiment may be included in another embodiment or may be replaced with corresponding components or characteristics of another embodiment.

For example, contents on setting of a location of an additional DMRS described in Embodiment 1 may be commonly applied to various embodiments of the present disclosure.

Hereinafter, in the present disclosure, the number of DMRSs may be interpreted as the number of OFDM symbols to which the DMRSs are mapped.

Embodiment 1

FIG. 11 is a diagram illustrating an example of a method of mapping a DMRS according to the number of additionally set DMRSs proposed in the present disclosure.

Referring to FIG. 11, when an additional DMRS is mapped to the specific number or more of ODFM symbols and is set to the UE, a location of the additional DMRS may be changed according to the location of the front-load DMRS.

Specifically, when the number of the additional DMRS is set to the UE as more than the specific number (e.g., three), a location of the additional DMRS may be changed to be set to the UE according to the location of the OFDM symbol to which the front-load DMRS is mapped.

In this case, the front-load DMRS and the additional DMRS may be together set in a specific time domain (e.g., slot) set for data transmission and reception to the UE, and when a location of the front-load DMRS is differently set, a location of the OFDM symbol to which the additional DMRS is mapped may also be changed and set.

For example, a location of the additional DMRS may be changed and set by a change amount in which a location of the front-load DMRS is changed (e.g., the number of OFDM symbols).

In Embodiment 1, "a case in which the number of additional DMRSs is set to the UE as more than the specific number" may be interpreted as a case in which a density of DMRSs is high in the time domain. Further, the front-load DMRS and the additional DMRS are not separately referred to, and both may be referred to as a DMRS.

Therefore, Embodiment 1 may be interpreted as a method of setting a DMRS pattern to which the DMRSs are mapped when a DMRS pattern has a high density in the time domain.

When DMRS patterns of the front-load DMRS and the additional DMRS are set to the UE using Embodiment 1, a rule may be defined in which the base station notifies a DMRS pattern to the UE through a predefined signal (e.g., a physical layer signal or a higher layer signal) or a DMRS pattern of an additional DMRS according to mapping of the front-load DMRS between the base station and the UE may be fixedly applied.

Embodiment 1 is a method of setting a position of an OFDM symbol to which additional DMRSs are mapped according to a change in a location of an OFDM symbol to which a front-load DMRS is mapped, which may be applied as a method of setting a DMRS pattern according to an area of an OFDM symbol in which a PDCCH may be set.

For example, when an area in which the PDCCH may be set is maximum two OFDM symbols and maximum three OFDM symbols, Embodiment 1 may be applied to a method of setting a DMRS pattern according to a time domain density of the DMRS.

In Embodiment 1, the method of changing a location of the additional DMRS according to a change amount of a location of the front-load DMRS has been described, but this may be applied to the following method.

When the number of additional DMRSs is set to the specific number or more of UEs, the number of OFDM symbols that perform extrapolation may be set to a specific number (e.g., one) or less.

When the number of additional DMRSs is set to a specific number or more of UEs, the DMRS location may be set such that the number of OFDM symbols that perform interpolation is smaller than or equal to the number of OFDM symbols that perform extrapolation.

In this case, extrapolation may mean an OFDM symbol located outside the OFDM symbol to which the DMRS is mapped. That is, the number of OFDM symbols that perform extrapolation may mean the number of OFDM symbols before the first DMRS or the number of OFDM symbols after the last DMRS. Further, interpolation may mean OFDM symbols located inside an OFDM symbol to which DMRSs are mapped. That is, the number of OFDM symbols that perform interpolation may mean the number of OFDM symbols located between DMRSs.

Figure 11A:
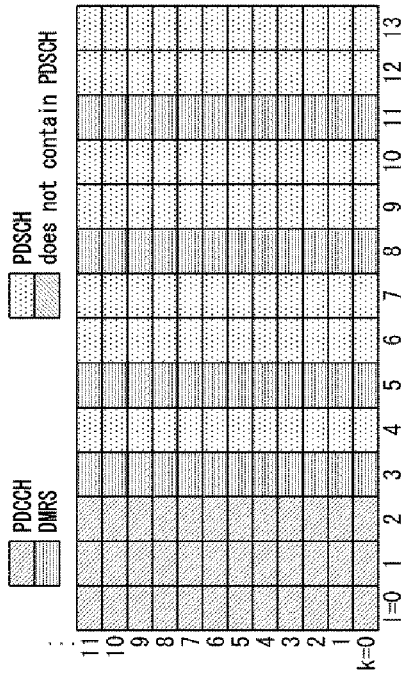
FIGS. 11A to 11D are diagrams illustrating an example of a method of mapping a DMRS according to the number of additionally set DMRSs proposed in the present disclosure.
Figure 11B:
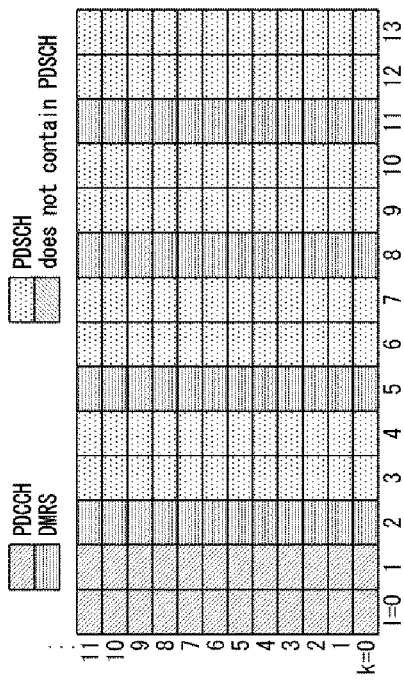

FIGS. 11A and 11B illustrate an example of a setting method in which the location of an additional DMRS is fixed regardless of a location of a front-load DMRS.

In FIGS. 11A and 11B, while the front-load DMRS moves from a symbol 2 to a symbol 3, an DMRS segment located at symbols 3 and 5 is reduced, whereas a last DMRS is located to a symbol 11 and thus a segment of extrapolation is long by two symbols.

In this way, in a case which the number of the additional DMRS is set to 3, when a location of the additional DMRS is fixed regardless of a location of the front-load DMRS, if a location of the front-load DMRS is changed, as illustrated in FIGS. 11A and 11B, an extrapolation area may be set larger than a segment between the front-load DMRS and the first additional DMRS, and a channel estimation performance may be degraded due to the time-varying channel in the extrapolation area.

When the number of additional DMRSs is set to 3, it has an object for supporting a very high speed UE and thus channel estimation due to the time-varying channel is more important, and thus an optimized symbol location of an optimized DMRS that may appropriately estimate the channel should be considered.

Figure 11C:
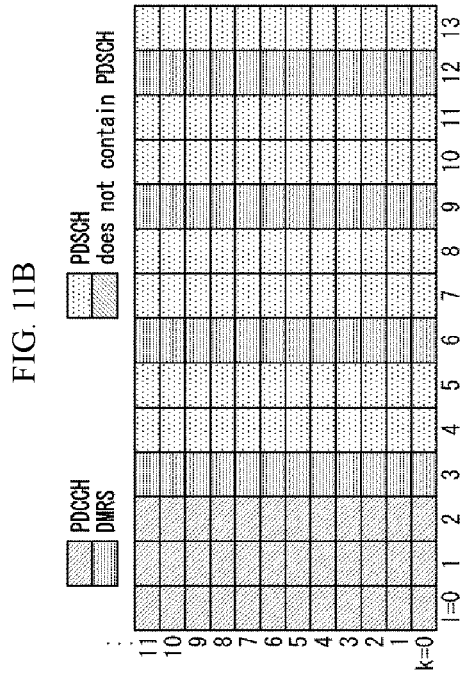
Figure 11D:
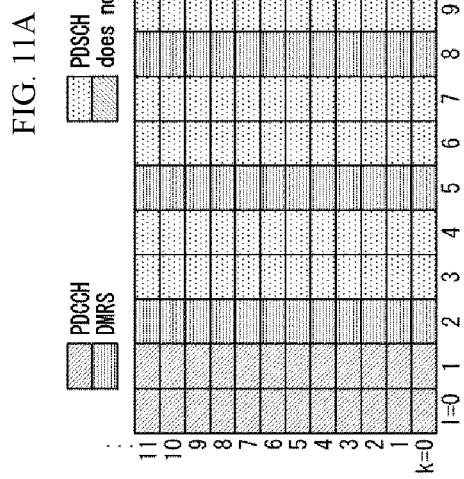

Therefore, when a location of the front-load DMRS is changed as illustrated in FIGS. 11C and 11D, a position of an additional DMRS is thus changed and thus a channel estimation performance can be improved due to the time-varying channel in an extrapolation area.

That is, in FIGS. 11C and 11D, when the front-load DMRS moves from a symbol 2 to a symbol 3, the additional DMRS may be moved and set by one OFDM symbol.

In this case, because the extrapolation area may be reduced while maintaining the same interpolation area, a time-varying estimation performance of the channel can be improved.

Embodiment 1-2

As an area in which the PDCCH may be set is set to maximum three OFDM symbols or more, when a position of the front-load DMRS is set after an area in which the PDCCH is set, the base station may set to the UE as the maximum setting number of additional DMRSs to a specific number x (e.g., two) symbols.

After an area in which the PDCCH may be set is set to maximum 2 OFDM symbols or less, when a position of the front-load DMRS is set, x may be set to a value smaller than or equal to the number y (e.g., 3) of maximum additional DMRSs that may be set.

In this case, an area capable of transmitting data in a slot may vary according to an area in which a PDCCH may be set. The larger area in which the PDCCH may be set may mean that an area for transmitting data becomes smaller.

In this case, an RS overhead may increase due to an additional DMRS. Therefore, by varying the number of additional DMRSs that may be set according to a size of an area in which the PDCCH may be set, an RS overhead may be prevented from excessively increasing.

Further, when using Embodiment 1-2, by reducing the number of DMRS patterns that may be defined between the base station and the UE, implementation complexity of the UE can be reduced.

Embodiment 1-3

Figure 12A:
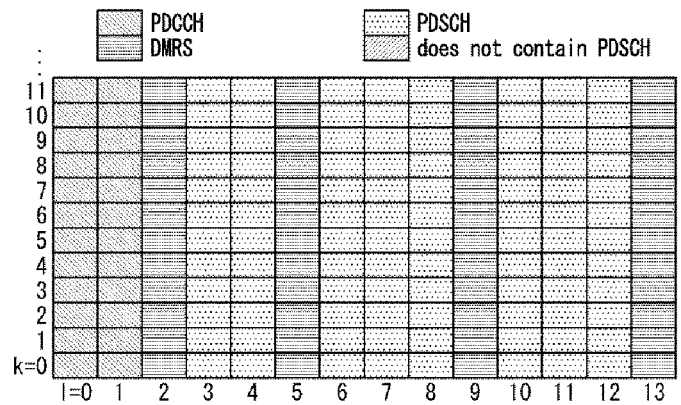
FIG. 12A to 12C are diagrams illustrating another example of a method of mapping a DMRS according to the number of additionally set DMRSs proposed in the present disclosure.
Figure 12B:
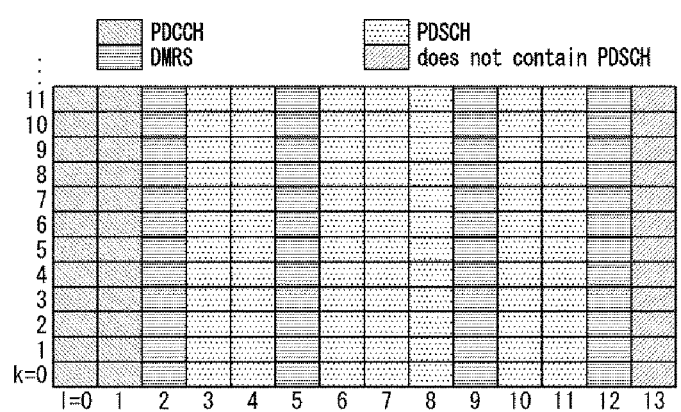
Figure 12C:
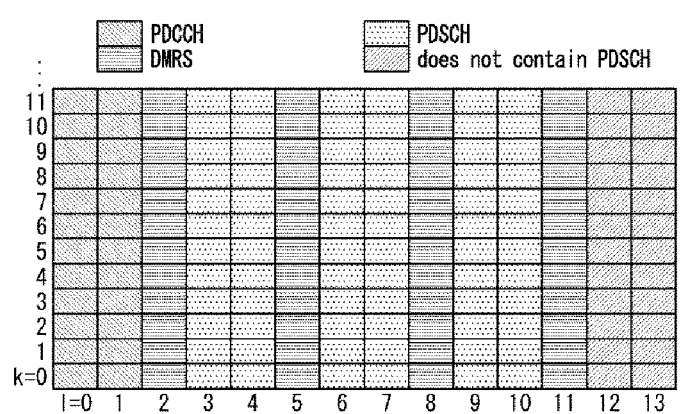

FIGS. 12A to 12C are diagrams illustrating another example of a method of mapping a DMRS according to the number of additionally set DMRSs proposed in the present disclosure.

Referring to FIGS. 12A to 12C, when the number of additional DMRSs is set to the UE as a specific number x (e.g., 3) or more, a position of a last additional DMRS may be set to be transmitted to a last symbol among OFDM symbols set to data transmission.

Figure 13A:
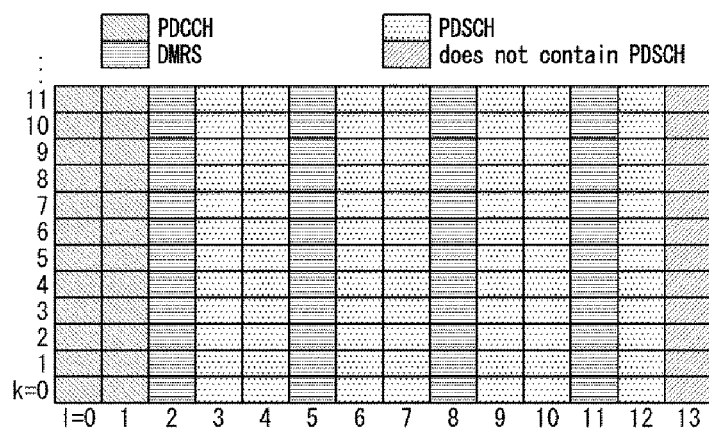
FIG. 13A to 13B are diagrams illustrating an example of a method of mapping a DMRS when demodulation references of the number smaller than the maximum number proposed in the present disclosure are set.
Figure 13B:
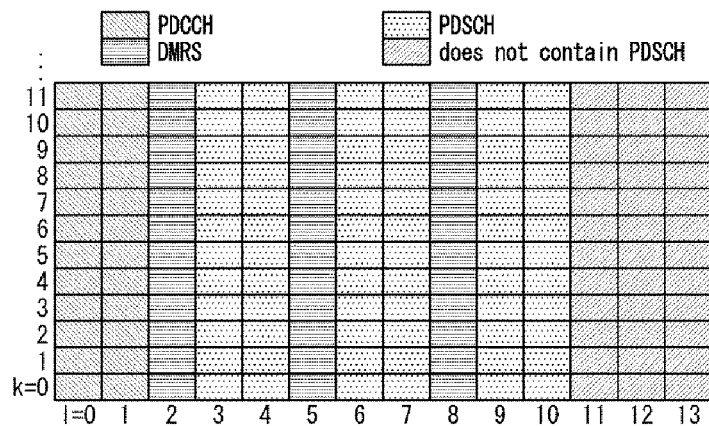

Specifically, as illustrated in FIGS. 13A to 13B, when the number of additional DMRSs is set to 'x' or more, it may be an object for supporting a very high speed UE.

Therefore, in this case, time-varying estimation of the channel is more important, and an OFDM symbol position of an optimized DMRS capable of appropriately estimating it should be considered.

Therefore, in order to prevent extrapolation having a greater effect on channel estimation performance degradation, by setting a location of the last additional DMRS to a last symbol among OFDM symbols set to data transmission, an extrapolation area may not be generated.

In the case of Embodiment 1-3, because a location of an additional DMRS is set so that an extrapolation area does not occur, degradation of a channel estimation performance can be prevented due to the time-varying channel in the extrapolation area.

Because Embodiments 1 to 1-3 may be included as one of implementation methods of the present disclosure, it is obvious that it may be regarded as a kind of proposed schemes. Further, the above-described schemes of Embodiments 1 to 1-3 may be implemented independently, but may be implemented in a combination (or merge) form of some proposed schemes.

In information for applying the proposed methods (or information on the rules of the proposed methods), a rule may be defined so that the base station notifies through a predefined signal (e.g., a physical layer signal or a higher layer) to the UE or the transmitting UE notifies through a predefined signal (e.g., a physical layer signal or a higher layer) to the receiving UE.

In a specific example of the proposal, even when only the case of DL or UL is illustrated, the present proposal may be applied to all cases of DL/UL, unless it is specified that the technical application is limited to DL or UL.

Further, the proposed method is not limited only to uplink or downlink communication, and the proposed method may be applied to direct communication between UEs, a base station, a vehicle, a relay node, and the like.

The Actual Number and Location of Transmitted DMRS in Given Slot Format

Positions of a 1-symbol front-load DMRS and a 2-symbol additional DMRS may be defined as illustrated in Tables 19 and 20, respectively.

As illustrated in Tables 19 and 20, a position of a last PDSCH that may be defined according to the number of additional DMRSs may be different. In this case, the position of the last PDSCH may mean symbol information related to a last symbol of the downlink shared channel.

That is, the position of the last PDSCH may mean a position of a last OFDM symbol to which the downlink data may be transmitted or may mean duration of the PDSCH for data transmission.

Portions corresponding to N/A in Tables 19 and 20 represent portions in which a DMRS pattern is not defined due to problems such as an RS overhead.

In Tables 19 and 20, symbol information "Position of last PDSCH Symbol" may be dynamically set to the UE through DCI, and the number of preset additional DMRSs may be set to the UE through higher layer signaling (e.g., RRC signaling).

In this case, when the number of additional DMRSs set through higher layer signaling may not be defined in the "Position of last PDSCH symbol" that is flexibly set, there is a need to define an operation between the base station and the UE for a portion corresponding to N/A in Tables 19 and 20.

Accordingly, hereinafter, when the number of additional DMRSs set through higher layer signaling may not be defined in the position of last PDSCH symbol (hereinafter, referred to as symbol information) that is flexibly set, an operation between the UE and the base station is proposed.

Embodiment 2

The base station may set a specific value of symbol information that can support the number of additional DMRSs semi-statically set to the UE through higher layer signaling to the UE.

For example, in the case of one 1-symbol additional DMRS in Tables 19 and 20, the symbol information may set one of values corresponding to 8th, 9th, 10th, 11th, 12th, and 13th to an undefined N/A value.

Further, in the case of two 1-symbol additional DMRS, the symbol information may set one of values corresponding to 9th, 10th, 11th, 12th, and 13th to an undefined N/A value.

That is, the base station may set one of values defined through higher layer signaling to the UE as an undefined N/A value.

When using such a method, the UE may assume that symbol information that may not be supported by the number of additional DMRSs set through higher layer signaling is not set from the base station and thus there is no need to define a separate operation for the corresponding case and complexity may be thus reduced.

Further, as in the following description, an operation may be defined between the base station and the UE such that symbol information in which the number of additional DMRSs set to the UE through higher layer signaling is not defined is set to the UE.

That is, symbol information in which the number of additional DMRSs set to the UE through higher layer signaling is not supported may correspond to a case in which there are few OFDM symbols allocated to a data channel.

In this case, in order to reduce an RS overhead because the RS overhead is larger even if the same additional DMRS number is set, a method of flexibly switching with the smaller number of additional DMRSs may be applied.

When using such a method, the number of OFDM symbols allocated to the data channel is small and thus even if the smaller number of additional DMRSs are used, time-varying of a channel may be estimated.

Embodiment 3

FIGS. 13A to 13B are diagrams illustrating an example of a method of mapping a DMRS when demodulation references of the number smaller than the maximum number proposed in the present disclosure are set.

Referring to FIGS. 13A to 13B, when the number of additional DMRSs set through higher layer signaling may not be supported, additional DMRSs defined after a last OFDM symbol by symbol information may not be transmitted.

Specifically, when the number of additional DMRSs set through higher layer signaling may not be supported, i.e., when a location of a last OFDM symbol of a PDSCH defined by symbol information is a symbol before a last location of the additional DMRS, the last additional DMRS may not be transmitted.

For example, when the number of additional DMRSs is set to three through higher layer signaling and the additional DMRSs are located at 5th, 8th, and 11th OFDM symbols, respectively, and as illustrated in FIG. 13A, when a location of a last PDSCH is a 13th OFDM symbol by symbol information, all preset addition DMRS may be transmitted. However, as illustrated in FIG. 13B, when a location of the last PDSCH is a 10th OFDM symbol by the symbol information, an additional DMRS of an 11th OFDM symbol is not transmitted.

Table 21 illustrates an example of a 1-symbol additional DMRS.

TABLE 21

| Position of the last PDSCH | One 1-symbol additional DMRS | Two 1-symbol additional DMRS | Three 1-symbol additional DMRS |
|---|---|---|---|
| $13^{th}$ | $11^{th}$ | $7^{th}, 11^{th}$ | $5^{th}, 8^{th}, 11^{th}$ |
| $12^{th}$ | $11^{th}$ | $7^{th}, 11^{th}$ | $5^{th}, 8^{th}, 11^{th}$ |
| $11^{th}$ | $9^{th}$ | $6^{th}, 9^{th}$ | $5^{th}, 8^{th}, 11^{th}$ |
| $10^{th}$ | $9^{th}$ | $6^{th}, 9^{th}$ | $5^{th}, 8^{th}$ |
| $9^{th}$ | $9^{th}$ | $6^{th}, 9^{th}$ | $5^{th}, 8^{th}$ |
| $8^{th}$ | $7^{th}$ | $6^{th}$ | $5^{th}, 8^{th}$ |

As illustrated in Table 21, values that were N/A in Tables 19 and 20 may be defined to specific values.

In this case, when the specific value is defined to a definite value or corresponds to a specific condition, the UE and the base station may be defined to operate according to a corresponding rule.

Embodiment 4

FIGS. 14 and 15 are diagrams illustrating another example of a method of mapping a DMRS when demodulation references of the number smaller than the maximum number proposed in the present disclosure are set.

Referring to FIGS. 14 and 15, when the number of additional DMRSs set through higher layer signaling may not be supported, additional DMRSs may be transmitted to locations of the maximum number of additional DMRSs that may be defined according to symbol information.

Specifically, the number of additional DMRS set through higher layer signaling transmitted from the base station to the UE may not be supported according to the number of symbols set by symbol information.

For example, when the number of additional DMRSs set through higher layer signaling in Table 17 is 3, additional DMRSs are mapped to 5th, 8th, and 11th OFDM symbols and transmitted.

However, when a location of the last PDSCH is set to an OFDM symbol smaller than a 9th OFDM symbol or when the number of symbols to which the PDSCH is mapped is smaller than 9 by symbol information of DCI, additional DMRSs mapped to the 11th OFDM symbol may not be transmitted.

In this case, the additional DMRS may be transmitted in maximum two OFDM symbols, wherein a location of the OFDM symbol to which the additional DMRS is transmitted may be 6th and 9th OFDM symbols, which are the location of the OFDM symbol when the number of additional DMRSs set through higher layer signaling is 2.

That is, when three 1-symbol additional DMRSs are set through higher layer signaling and when symbol information is set to a 7th OFDM symbol or the number of symbols to which the PDSCH is mapped is set to 7 through DCI, a location of OFDM symbols to which the additional DMRS is mapped may be the same as a location of an additional DMRS of the case of being set to two 1-symbol additional DMRSs through higher layer signaling.

In other words, when at least one additional DMRS is mapped to the number smaller than the maximum number of symbols to which additional DMRSs for demodulating downlink data set through higher layer signaling are mapped, the at least one additional DMRS may be mapped to a symbol of the same location as a mapping location of an additional DMRS having the smaller number as the maximum number of symbols to which the additional DMRS is mapped.

Table 22 illustrates an example of a 1-symbol additional DMRS.

TABLE 22

| Position of the last PDSCH | One 1-symbol additional DMRS | Two 1-symbol additional DMRS | Three 1-symbol additional DMRS |
|---|---|---|---|
| $13^{th}$ | $11^{th}$ | $7^{th}, 11^{th}$ | $5^{th}, 8^{th}, 11^{th}$ |
| $12^{th}$ | $11^{th}$ | $7^{th}, 11^{th}$ | $5^{th}, 8^{th}, 11^{th}$ |
| $11^{th}$ | $9^{th}$ | $6^{th}, 9^{th}$ | $5^{th}, 8^{th}, 11^{th}$ |
| $10^{th}$ | $9^{th}$ | $6^{th}, 9^{th}$ | $6^{th}, 9^{th}$ |
| $9^{th}$ | $9^{th}$ | $6^{th}, 9^{th}$ | $6^{th}, 9^{th}$ |
| $8^{th}$ | $7^{th}$ | $7^{th}$ | $7^{th}$ |

Figure 14A:
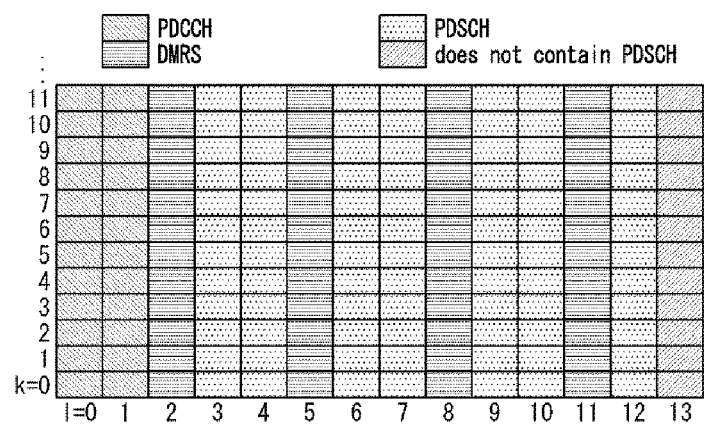

As illustrated in FIG. 14A, when three 1-symbol additional DMRSs are set through higher layer signaling and when a location of a last PDSCH of symbol information is set to 12th or when a segment of the PDSCH is set to 13 through DCI, the additional DMRS may be transmitted in 5th, 8th, and 11th OFDM symbols, as illustrated in Tables 19 and 22.

Figure 14B:
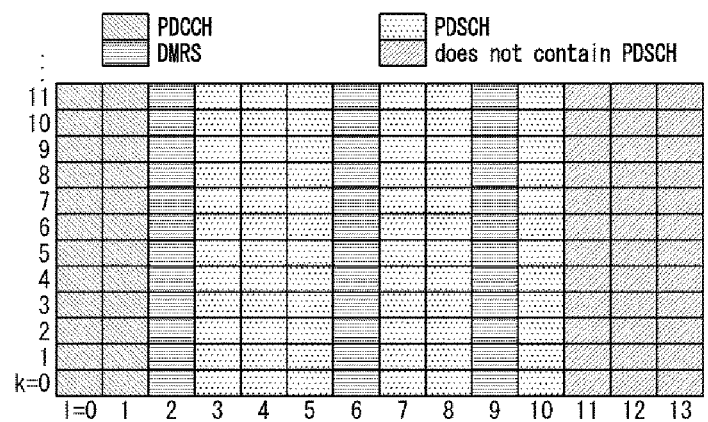

However, as illustrated in FIG. 14B, when three 1-symbol additional DMRSs are set through higher layer signaling and when a last PDSCH location of symbol information is set to 10th, or when a segment of the PDSCH is set to 11 through DCI, an additional DMRS that should be mapped to the 11th OFDM symbol may not be transmitted.

Therefore, in this case, additional DMRSs may be transmitted in 6th and 9th OFDM symbols, which are the same locations as locations of symbols to which the additional DMRSs are mapped in two 1-symbol additional DMRSs.

Through Embodiment 4, the maximum number of additional DMRSs that may be set semi-statically to the UE through higher layer signaling may be set, and the number of additional DMRSs transmitted to the actual UE may be set through DCI.

That is, the number of additional DMRSs set through higher layer signaling to the UE may be defined to a maximum value of the number of additional DMRSs that may be set to the UE. Further, it is possible to set the number and location of additional DMRSs actually transmitted to the UE through the DCI.

In this case, a specific rule may be set such that the number and location of additional DMRSs are directly set to the UE through a specific DCI field or the number and location of additional DMRSs are set from other information that is flexibly set, such as symbol information.

When using this method, there is an effect that can set a DMRS pattern that is most suitable for the symbol information flexibly set to the UE.

For example, because Embodiment 3 is a method of not transmitting a random DMRS symbol, it may be not regarded that the pattern of Embodiment 3 is the DMRS pattern most suitable for symbol information, but in Embodiment 4, because the pattern is set in consideration of the specific number of additional DMRSs in the symbol information, it may be regarded that the most suitable DMRS pattern is set.

Further, when multiplexing a long PUCCH, a short PUCCH, or an SRS in a slot serving a plurality of UEs having three additional DMRSs in DL, scheduling flexibility can be improved.

Further, flexibility in an MU-MIMO environment can be improved. For example, because UEs 1 and 2 may enable MU-paring of corresponding UEs in specific symbol information that is flexibly set even when the number of additional DMRSs different from each other is set through higher layer signaling, there is an effect to improve cell throughput.

In this case, the number of additional DMRSs may be reduced according to the symbol information, but may not be increased, and in order to increase flexibility of MU-MIMO in specific symbol information, the number of additional DMRSs much by one step than the number of additional DMRSs set by higher layer signaling may be set through DCI information of 1-bit.

In this case, the specific number may be defined to a definite value or may be defined such that the UE and the base station operate according to a specific rule under a specific condition.

In Embodiment 4, a location of a last PDSCH symbol or a PDSCH segment, which is symbol information, may be set from the base station to the UE. In this case, the base station may be defined to notify the UE through a predefined signal (e.g., a physical layer signal or a higher layer signal).

In this case, a location of the last PDSCH symbol or a value of duration of the PDSCH may be notified directly as a definite value by the base station or may be implicitly notified according to a previously promised rule between the base station and the UE through another value set to the UE.

For example, the base station may set an index of a start symbol of the PDSCH and duration of the PDSCH through DCI signaling, and the UE may implicitly recognize a location of the last PDSCH symbol based on an index of a start symbol of the PDSCH and duration of the PDSCH.

The above-described Embodiments 1 to 4 may be implemented independently, but may be implemented in a combination (or merge) form of some embodiments.

Information for indicating whether Embodiments 1 to 4 are applied (or information about rules of Embodiments) may be notified to the UE through a signal (e.g., a physical layer signal or a higher layer signal) in which the base station predefines to the UE. For example, the base station may notify the UE of a method to be applied to Embodiments 1 to 4 through a predefined signal.

Tables 23 and 15 illustrate an example in which Embodiments 3 and 4 among Embodiments 1 to 4 are applied.

TABLE 23

| Position of the last PDSCH | One 1-symbol additional DMRS | Two 1-symbol additional DMRS | Three 1-symbol additional DMRS |
|---|---|---|---|
| $13^{th}$ | $11^{th}$ | $7^{th}, 11^{th}$ | $5^{th}, 8^{th}, 11^{th}$ |
| $12^{th}$ | $11^{th}$ | $7^{th}, 11^{th}$ | $5^{th}, 8^{th}, 11^{th}$ |
| $11^{th}$ | $9^{th}$ | $6^{th}, 9^{th}$ | $5^{th}, 8^{th}, 11^{th}$ |
| $10^{th}$ | $9^{th}$ | $6^{th}, 9^{th}$ | $6^{th}, 9^{th}$ |
| $9^{th}$ | $9^{th}$ | $6^{th}, 9^{th}$ | $5^{th}, 8^{th}$ |
| $8^{th}$ | $7^{th}$ | $7^{th}$ | $5^{th}, 7^{th}$ or $5^{th}$ |

FIG. 15A illustrates a case in which all of the additional DMRS numbers set through higher layer signaling can be supported.

However, FIGS. 15(a) and 15(b) illustrate an example of a case that may not support all of the number of additional DMRSs set through higher layer signaling.

In this case, in FIG. 15B, a method of Embodiment 4 is applied to transmit an additional DMRS in 6th and 9th OFDM symbols according to Table 21, and in FIG. 15C, a method of Embodiment 3 is applied to transmit an additional DMRS in 5th and 8th OFDM symbols according to Table 21.

In a specific example of the proposal, even when only the case for DL or UL is illustrated, the present disclosure may be applicable to all cases of DL/UL, unless it is specified that the technical application is limited to DL or UL.

Further, the proposed method is not limited only to uplink or downlink communication, and the proposed method may be applied to direct communication between UEs, a base station, a vehicle, a relay node, and the like.

The Actual Number and Location of Transmitted DMRS for PUSCH without Hopping

A location of a front-load DMRS for a PUSCH that does not perform frequency hopping is as follows. Further, when the front-load DMRS is located at a 3rd or 4th symbol of a slot, a location of the additional DMRS is as follows.

A first OFDM symbol for scheduled data includes a front-load UL DMRS.

The 3rd or 4th symbol of the slot includes a first symbol of the front-load DMRS.

The location of the addition DMRS may be the same in UL and DL.

When the first symbol of the front-load DMRS is located at the 3rd or 4th symbol of the slot, a DL DMRS location for an UL DMRS for additional DMRS symbols may be used again for a PUSCH without a hop.

In this case, there is a problem that a location of the additional DMRS is not defined for the case in which the front-load DMRS is located at the first symbol of the PUSCH.

Therefore, when the front-load DMRS is located at the first symbol of the PUSCH, a method of setting a location of the additional DMRS is proposed.

Table 24 illustrates an example of a location of the first symbol of the PUSCH and a location of additional DMRS according to the number of additional DMRSs.

TABLE 24

| Position of the first PUSCH symbol(starting from $0^{th}$) | One 1-symbol additional DMRS | Two 1-symbol additional DMRS | Three 1-symbol additional DMRS |
|---|---|---|---|
| $1^{st}$ | $12^{th}$ | $7^{th}, 12^{th}$ | $5^{th}, 9^{th}, 12^{th}$ |
| $2^{nd}$ | $12^{th}$ | $7^{th}, 12^{th}$ | $5^{th}, 9^{th}, 12^{th}$ |
| $3^{rd}$ | $12^{th}$ | $8^{th}, 12^{th}$ | $6^{th}, 9^{th}, 12^{th}$ |
| $4^{th}$ | $12^{th}$ | $8^{th}, 12^{th}$ | N/A |

TABLE 24-continued

| Position of the first PUSCH symbol(starting from $0^{th}$) | One 1-symbol additional DMRS | Two 1-symbol additional DMRS | Three 1-symbol additional DMRS |
|---|---|---|---|
| $5^{th}$ | $12^{th}$ | $9^{th}, 12^{th}$ | N/A |
| $6^{th}$ | $12^{th}$ | $9^{th}, 12^{th}$ | N/A |
| $7^{th}$ | $12^{th}$ | N/A | N/A |
| $8^{th}$ | $12^{th}$ | N/A | N/A |
| $9^{th}$ | $12^{th}$ | N/A | N/A |
| $10^{th}$ | N/A | N/A | N/A |
| $11^{th}$ | N/A | N/A | N/A |
| $12^{th}$ | N/A | N/A | N/A |
| $13^{th}$ | N/A | N/A | N/A |

In Table 24, a location (hereinafter, referred to as uplink symbol information) of a first PUSCH symbol that may be supported according to the number of additional DMRSs is defined differently. The maximum number of additional DMRSs may be set differently in consideration of an RS overhead according to the uplink symbol information.

The number of additional DMRSs for uplink transmission may be set to the UE through higher layer signaling, and uplink symbol information may be flexibly set to the UE.

Therefore, when uplink symbol information that may not support the number of additional DMRSs set through higher layer signaling is set, an operation between the base station and the UE should be defined.

Accordingly, the present disclosure proposes an operation between the base station and the UE when uplink symbol information that may not support the number of additional DMRSs set through higher layer signaling is set.

Embodiment 5

The base station may set a specific value of uplink symbol information that may support the number of additional DMRS set semi-statically to the UE through higher layer signaling to the UE.

For example, in Table 22, in a case of one 1-symbol additional DMRS, one of values of {1st, 2nd, 3rd, 4th, 5th, 6th, 7th, 8th, and 9th} may be set as a value of uplink symbol information. Further, in the case of one 1-symbol additional DMRS, one of values of {1st, 2nd, 3rd, 4th, 5th, and 6th} may be set as a value of uplink symbol information.

Using this method, the UE may assume that uplink symbol information that may not be supported in the number of additional DMRSs set through higher layer signaling is not set from the base station, and may not thus define a separate operation for the case and thus complexity can be reduced.

Alternatively, as in Embodiment 5, an operation between the base station and the UE may be defined such that uplink symbol information in which the number of additional DMRSs set to the UE through higher layer signaling is not defined may be set to the UE.

Embodiment 6

When the number of additional DMRSs set through higher layer signaling may not be supported, additional DMRSs may be transmitted at locations of the maximum number of additional DMRSs that may be defined according to uplink symbol information.

That is, the method described in Embodiment 4 may also be used for transmission of DMRSs for uplink data.

Specifically, the number of additional DMRSs set through higher layer signaling transmitted from the base station to the UE may not be supported according to the number of symbols set by uplink symbol information.

For example, when the number of additional DMRSs set through higher layer signaling in Table 24 is 3, additional DMRSs may be mapped and transmitted to 5th, 9th, and 12th OFDM symbols or 6th, 9th, and 12th OFDM symbols.

However, when a location of a first PUSCH symbol is set to an OFDM symbol after a 3rd OFDM symbol or when a segment of a symbol to which the PUSCH is mapped is smaller than 12 by uplink symbol information of DCI, the additional DMRS mapped to the 12th OFDM symbol may not be transmitted.

In this case, the additional DMRS may be transmitted in maximum two OFDM symbols, wherein a location of the OFDM symbol to which the additional DMRS is transmitted may be 8th and 12th OFDM symbols or 9th and 12th OFDM symbol, which are the location of the OFDM symbol when the number of additional DMRSs set through higher layer signaling is 2.

That is, when three 1-symbol additional DMRSs are set through higher layer signaling and when uplink symbol information is OFDM symbols after the 3rd OFDM symbol or the number of symbols to which a PDSCH is mapped is set to be smaller than 12 through DCI, a location of the OFDM symbol to which the additional DMRS is mapped may be the same as a location of the additional DMRS when setting to two 1-symbol additional DMRSs through higher layer signaling.

In other words, when at least one additional DMRS is mapped to the number smaller than the maximum number of symbols to which additional DMRSs for demodulating uplink data set through higher layer signaling are mapped, at least one additional DMRS may be mapped to a symbol of the same location as a mapping location of additional DMRS having the small number as the maximum number of symbols to which the additional DMRS is mapped.

Table 25 illustrates an example of a 1-symbol additional DMRS.

TABLE 25

| Position of the first PUSCH symbol(starting from $0^{th}$) | One 1-symbol additional DMRS | Two 1-symbol additional DMRS | Three 1-symbol additional DMRS |
|---|---|---|---|
| $1^{st}$ | $12^{th}$ | $7^{th}, 12^{th}$ | $5^{th}, 9^{th}, 12^{th}$ |
| $2^{nd}$ | $12^{th}$ | $7^{th}, 12^{th}$ | $5^{th}, 9^{th}, 12^{th}$ |
| $3^{rd}$ | $12^{th}$ | $8^{th}, 12^{th}$ | $6^{th}, 9^{th}, 12^{th}$ |
| $4^{th}$ | $12^{th}$ | $8^{th}, 12^{th}$ | $8^{th}, 12^{th}$ |
| $5^{th}$ | $12^{th}$ | $9^{th}, 12^{th}$ | $9^{th}, 12^{th}$ |
| $6^{th}$ | $12^{th}$ | $9^{th}, 12^{th}$ | $9^{th}, 12^{th}$ |
| $7^{th}$ | $12^{th}$ | $12^{th}$ | $12^{th}$ |
| $8^{th}$ | $12^{th}$ | $12^{th}$ | $12^{th}$ |
| $9^{th}$ | $12^{th}$ | $12^{th}$ | $12^{th}$ |
| $10^{th}$ | N/A | N/A | N/A |
| $11^{th}$ | N/A | N/A | N/A |
| $12^{th}$ | N/A | N/A | N/A |
| $13^{th}$ | N/A | N/A | N/A |

As illustrated in Table 25, a value for an additional DMRS location corresponding to N/A in Table 24 may be set to a specific value.

Through Embodiment 6, the maximum number of additional DMRSs that may be set semi-statically to the UE through higher layer signaling may be set, and the number of additional DMRSs transmitted to the actual UE may be set through DCI.

That is, the number of additional DMRSs set through higher layer signaling to the UE may be defined to a maximum value of the number of additional DMRSs that may be set to the UE. Further, it is possible to set the number and location of additional DMRSs actually transmitted to the UE through DCI.

In this case, a specific rule may be set such that the number and location of additional DMRSs are directly set to the UE through a specific DCI field, or the number and location of additional DMRSs are set from other information that is flexibly set such as symbol information.

In Embodiment 6, a location of a first PUSCH symbol or a segment of the PUSCH, which is uplink symbol information, may be set from the base station to the UE. In this case, the base station may be defined to notify the UE through a predefined signal (e.g., a physical layer signal or a higher layer signal).

In this case, a location of the first PUSCH symbol or a value of the segment of the PUSCH may be directly notified as a definite value by the base station or implicitly notified according to a previously promised rule between the base station and the UE through another value set to the UE.

The above-described Embodiments 5 and 6 may be implemented independently, but may be implemented in a combination (or merge) form of some embodiments.

Information (or information on rules of the above embodiments) for indicating whether Embodiments 5 and 6 are applied may be notified to the UE through a signal (e.g., a physical layer signal or a higher layer signal) predefined by the base station to the UE. For example, the base station may notify the UE of a method to be applied to Embodiments 5 and 6 through a predefined signal.

In a specific example of the proposal, even when only the case for DL or UL is illustrated, the present disclosure may be applicable to all cases of DL/UL, unless it is specified that the technical application is limited to DL or UL.

Further, the proposed method is not limited to uplink or downlink communication, and the proposed method may be applied to direct communication between UEs, a base station, a vehicle, a relay node, and the like.

As described above, the front-load DMRS of the PUSCH may be transmitted in the following three locations.

First OFDM symbol for scheduled data

3rd or 4th symbol of the slot

When the front-load DMRS is located at 3rd or 4th, a location of the additional DMRS may use a location of the existing DL DMRS. However, there is a problem that an additional DMRS location is not defined when the front-load DMRS is located at a first OFDM symbol of scheduled data.

Accordingly, the present disclosure proposes a method of setting a location of an additional DMRS when the front-load DMRS is located at the first OFDM symbol.

Embodiment 7

FIGS. 16A to 17B are diagrams illustrating another example of a method of mapping a DMRS proposed in the present disclosure.

Referring to FIGS. 16A to 17B, when an additional DMRS is set to one 1-symbol additional DMRS or one 2-symbol additional DMRS (e.g., when a front load DMRS is set to one symbol and an additional DMRS is set to one symbol or when front load DMRSs are continuously set to two symbols and additional DMRSs are continuously set to two symbols), a location of the additional DMRS may be defined so that an extrapolation segment does not exceed the maximum 'x' number of OFDM symbols (e.g., x is '2').

In this case, as a length of the data transmission segment increases, a location of the additional DMRS may be set through Equation 7.

$$y1\_new = y1\_old + x + 1 \quad \text{[Equation 7]}$$

In Equation 7, as a length of the data transmission segment increases, when an additional DMRS may be transmitted to a y1_new location, a location of the additional DMRS may be changed from y1_old to y1_new.

In Equation 7, y1_new may mean a location of a newly defined additional DMSR (e.g., OFDM symbol index starting from a front-load DMRS location) as a length of the data transmission segment increases.

y1_old may mean a location of an additional DMRS (e.g., an OFDM symbol index starting from a front-load DMRS location) before a data transmission segment length increases.

FIGS. 16A to 16C illustrate an example of locations of additional DMRSs set in one 1-symbol additional DMRS, and FIGS. 17A and 17B illustrate an example of a location of an additional DMRS set in one 2-symbol additional DMRS.

In case of using Embodiment 7, an extrapolation segment that greatly affects estimation performance deterioration of a time-varying channel may be limited to a predetermined value or less, thereby improving an estimation performance of the time-varying channel.

Further, when the length of the data transmission segment increases, the additional DMRS location is changed to prevent a plurality of DMRS patterns from being defined, thereby preventing complexity from increasing.

Further, in the case of the PUSCH DMRS, additional DMRS locations can be flexibly set according to a data segment length occupied by the PUSCH.

Embodiment 8

FIGS. 18A to 20B are diagrams illustrating another example of a method of mapping a DMRS proposed in the present disclosure.

Referring to FIGS. 18A to 20B, when the additional DMRS is set to two 1-symbol additional DMRSs or three 1-symbol additional DMRSs (e.g., when a front-load DMRS is set to one symbol and when additional DMRSs are set to two symbols separated from each other, or when a front-load DMRS is set to one symbol and when additional DMRSs are set to three symbols separated from each other), a location of the additional DMRS may be defined so that an extrapolation segment exceeds the maximum 'x' number of OFDM symbols (e.g., x is '1').

In this case, as a length of the data transmission segment increases, a location of the additional DMRS may be determined according to Equations Y and Z.

When the additional DMRS is set to two 1-symbol additional DMRSs, the location of the additional DMRS may be determined by Equation 8.

$$y1\_new = y1\_old + x'$$

$$y2\_new = y2\_old + x' + 1 \quad \text{[Equation 8]}$$

As a length of the data transmission segment increases, when additional DMRSs may be transmitted at a y2_new location, two additional DMRSs mapped to symbols separated from each other may be changed and transmitted according to Equation 8.

FIGS. 18A to 18C illustrate an example in which a location is changed according to Equation Y when the additional DMRS is set to two 1-symbol additional DMRSs.

When the additional DMRS is set to three 1-symbol additional DMRS, the location of the additional DMRS may be determined by Equation 9.

$$y1\_new = y1\_old + x'$$

$$y2\_new = y2\_old + x' + 1$$

$$y3\_new = y3\_old + x' + 1 \quad \text{[Equation 9]}$$

As a length of the data transmission segment increases, when additional DMRSs may be transmitted at a y3_new location, two additional DMRSs mapped to symbols separated from each other may be changed and transmitted according to Equation 9.

FIGS. 19A and 19B illustrate an example in which a location is changed according to Equation Z when the additional DMRS is set to two 1-symbol additional DMRSs.

In Equations 8 and 9, y1_new, y2_new, and y3_new may mean newly defined locations (e.g., OFDM symbol index starting from front-load DMRS locations) of 1st, 2nd, and 3rd additional DMRSs as a length of the data transmission segment increases.

Figure 20A:
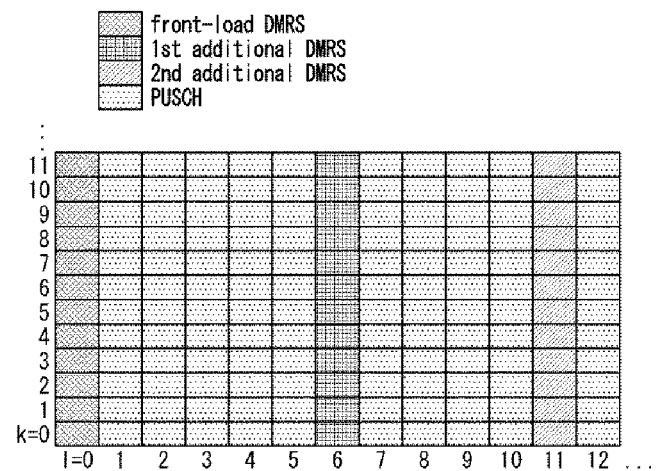
Figure 20B:
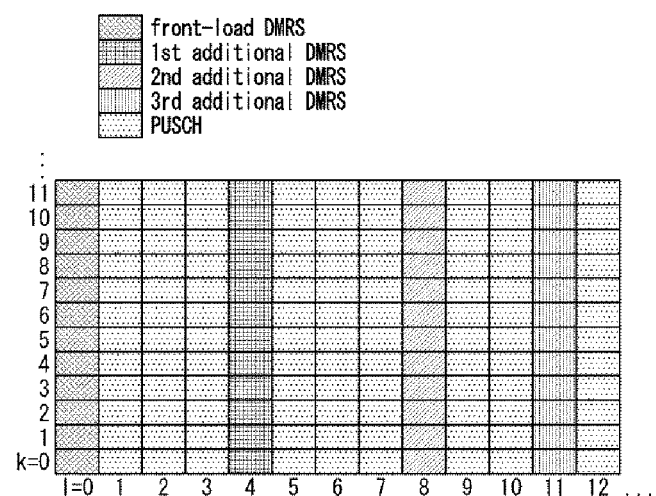

1st, 2nd, and 3rd additional DMRSs may mean additional DMRSs in order of close to the front-load DMRS, as illustrated in FIGS. 20A to 20B.

In Equations Y and Z, y1_old, y2_old, and y3_old may mean 1st, 2nd, and 3rd additional DMRS locations (e.g., OFDM symbol indexes starting from front-load DMRS locations) before a length of a data transmission segment increases.

Embodiment 8-1

When the number of additional DMRSs is set to k' or more (e.g., k'=2 or k'=3), a length (x') of the maximum extrapolation segment may be set to be smaller than a length x of the maximum extrapolation segment (e.g., x'<x) when the number of additional DMRSs is set to more than k (e.g., k=1, in this case, k<k' is satisfied).

Specifically, when the number of additional DMRSs is set to k' (k'>k) or more, an environment may be assumed in which a time-varying channel is large because a speed of the UE is relatively high, compared with the case in which the number of additional DMRSs is set to k.

In this case, because the influence of extrapolation causing performance deterioration may increase due to the time-varying channel, a DMRS pattern may be set to reduce a length of the extrapolation segment.

The methods described in Embodiments 8 and 8-1 correspond to one of the implementation methods of the present disclosure, and each may be implemented in an independent manner or in the form of a combination (or merge) of all or some of the methods.

Information (or information on rules of the embodiments) related to whether the method of Embodiments 8 and 8-1 is applied may be notified to the UE through a signal (e.g., physical layer signal or higher layer signal) in which the base station predefines to the UE. For example, the base station may notify the UE of the method to be applied among Embodiments 8 and 8-1 through a predefined signal.

In a specific example of the proposal, even when only the case for DL or UL is illustrated, the present disclosure may be applicable to all cases of DL/UL, unless it is specified that the technical application is limited to DL or UL.

Further, the proposed method is not limited only to uplink or downlink communication, and the proposed method may be applied to direct communication between UEs, a base station, a vehicle, a relay node, and the like.

Method for Configuration of the Number of and/or the Location of Additional DMRS for Broadcast/Multicast PDSCH and Unicast PDSCH Before RRC Configuration In addition to the PBCH, a front-load DMRS configuration 1 may be applied to broadcast/multicast.

However, the number and location of additional DMRSs are not defined. Therefore, the following description describes a method of setting the number and location of additional DMRS for a PDSCH transmitted before an RRC is configured.

That is, there is a need for a method of setting the number and location of additional DMRS for a PDSCH (e.g., broadcast/multicast PDSCH, unicast PDSCH before RRC connection) transmitted before the number and location of additional DMRSs are set to the UE through a predefined signal (e.g., physical layer signal or higher layer signal) between the base station and the UE.

Embodiment 9

When a PDSCH is received before higher layer signaling (e.g., RRC signaling, etc.) is configured, the number of additional DMRSs and a location of transmitted OFDM symbols may be set according to the number of preset additional DMRSs and symbol information related to start and end OFDM symbols of the PDSCH set through DCI.

Specifically, in a case of PDSCH transmission (e.g., broadcast/multicast PDSCH, unicast PDSCH before RRC connection) before the number and location of additional DMRS is set to the UE through a predefined signal (e.g., physical layer signal or higher layer signal) between the base station and the UE, the number and location of additional DMRSs may be set to the maximum number and location of values defined for unicast PDSCH transmission in a slot format in which the PDSCH is transmitted.

In this case, the slot format represents an area in which the PDSCH is transmitted and may vary depending on the start and end OFDM symbol locations of the PDSCH. That is, the slot format may mean transmission duration of the PDSCH according to the start OFDM symbol and the end OFDM symbol of the PDSCH.

Accordingly, the slot format may be referred to as various terms and may be set to the UE through a DL control channel.

The number and location of additional DMRSs may be defined according to an area in which the unicast PDSCH is transmitted, and the UE may implicitly infer the number and location of additional DMRS for the PDSCH transmitted before the number and location of additional DMRSs are set to the UE through a predefined signal (e.g., a physical layer signal or a higher layer signal) between the base station and the UE using information related to an area in which the unicast PDSCH is transmitted.

In this case, the area in which the unicast PDSCH is transmitted may be set to the UE through a last OFDM symbol index of the PDSCH.

Table 26 illustrates an example of the number and location of additional DMRSs of unicast PDSCH transmission.

TABLE 26

| Position of last PDSCH symbol | Additional DM-RS positions l PDSCH mapping type A DL-DMRS-add-pos | | | |
|---|---|---|---|---|
| | 0 | 1 | 2 | 3 |
| ≤7 | — | | | |
| 8 | — | 7 | | |
| 9 | — | 9 | 6, 9 | |
| 10 | — | 9 | 6, 9 | |
| 11 | — | 9 | 6, 9 | 5, 8, 11 |
| 12 | — | 11 | 7, 11 | 5, 8, 11 |
| 13 | — | 11 | 7, 11 | 5, 8, 11 |

In Embodiment 9, the UE may obtain information on a location of the last PDSCH symbol (hereinafter, referred to as symbol information) through DCI.

In Embodiment 9, the number and location of additional DMRSs for each symbol information may be set as follows, and the UE may implicitly infer this through the symbol information.

When the symbol information is '13', the number of additional DMRSs is '3', and a location thereof may be located at 5th, 8th, and 11th OFDM symbols.

When the symbol information is '10', the number of additional DMRSs is '2', and a location thereof may be located at 6th and 9th OFDM symbols.

When the symbol information is '8', the number of additional DMRSs is '1', and a location thereof may be located at the 7th OFDM symbol.

Using this method, when the last PDSCH symbol is flexibly set, an optimal additional DMRS may be transmitted in the symbol information and thus it is possible to provide a stable channel estimation performance even to a high speed UE.

Embodiment 9-1

In Embodiment 3, the maximum number of additional DMRSs may be limited to x (e.g., '2').

Specifically, the large number of additional DMRSs (e.g., 2) may be set when an accurate channel estimation performance is provided to a UE of a high speed to support a high MCS.

However, in the case of a broadcast/multicast PDSCH and a unicast PDSCH before RRC connection, a high MCS may not be used, and the large number of additional DMRSs may cause an unnecessary RS overhead to a UE having no high speed.

Therefore, in order to stably provide a channel estimation performance while appropriately maintaining an RS overhead, the maximum number of additional DMRSs may be limited to the specific number or less.

In Embodiment 9-1, the number and location of additional DMRSs for each symbol information may be set as follows according to Table 24, and the UE may implicitly infer this through the symbol information.

When the symbol information is '13', the number of additional DMRSs is '2', and a location thereof may be located at 7th and 11th OFDM symbols.

When the symbol information is '10', the number of additional DMRS is '2', and a location thereof may be located at 6th and 9th OFDM symbols.

When the symbol information is '8', the number of additional DMRS is '1', and a location thereof may be located at the 7th OFDM symbol.

Information (or information on rules of the embodiments) related to whether the method of Embodiments 9 and 9-1 is applied may be notified to the UE through a signal (e.g., a physical layer signal or a higher layer signal) predefined by the base station to the UE. For example, the base station may notify the UE of a method to be applied among Embodiments 9 and 9-1 through a predefined signal.

In a specific example of the proposal, even when only the case for DL or UL is illustrated, the present disclosure may be applicable to all cases of DL/UL, unless it is specified that the technical application is limited to DL or UL.

Further, the proposed method is not limited to uplink or downlink communication, and the proposed method may be applied to direct communication between UEs, a base station, a vehicle, a relay node, and the like.

Figure 21:
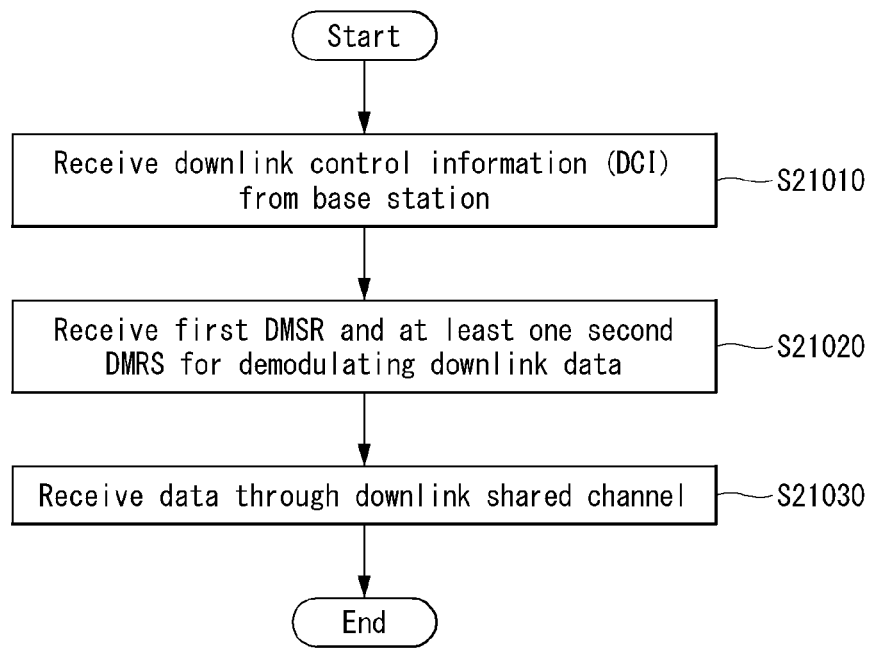
FIG. 21 is a flowchart illustrating an example of a method of transmitting and receiving data of a terminal proposed in the present disclosure.

FIG. 21 is a flowchart illustrating an example of a method of transmitting and receiving data of a UE proposed in the present disclosure. FIG. 21 is merely for convenience of description and does not limit the scope of the present disclosure.

Referring to FIG. 21, the UE may perform the method(s) described in the above-described embodiments of the present disclosure. In particular, the UE may support the method described in Embodiments 1 to 9-1. In FIG. 21, a detailed description repeated with the above description will be omitted.

First, the UE may receive downlink control information (DCI) from the base station (S21010). In this case, the downlink control information described in Embodiments 1 to 9-1 may include symbol information related to a last symbol of the downlink shared channel.

Thereafter, the UE may receive a front-load DMRS (first DMRS) and at least one additional DMRS (second DMRS) for demodulating downlink data (S21020).

In this case, the number of the at least one second DMRS and a location of a mapped symbol may be determined according to symbol information, as in the method described in Embodiments 1 to 9-1.

For example, the number of at least one second DMRS and a location of the mapped symbol may be set through the method of Embodiment 4.

Alternatively, when downlink data are a broadcast/multicast PDSCH transmitted before the number and location of at least one additional DMRS are set or a unicast PDSCH before an RRC connection, the number and location of the at least one additional DMRS may be set by Embodiment(s) 9 and/or 9-1.

Thereafter, the UE may receive data through the downlink shared channel (S21030).

The UE may be configured with a processor, an RF unit, and a memory, as illustrated in FIGS. 23 to 26, and the processor may control the RF unit to receive downlink control information (DCI) from the base station.

In this case, the downlink control information described in Embodiments 1 to 9-1 may include symbol information related to a last symbol of the downlink shared channel.

Further, the processor may control the RF unit to receive a first DMSR and at least one second DMRS for demodulating downlink data.

In this case, the number of the at least one second DMRS and a location of the mapped symbol may be determined according to symbol information, as in the method described in Embodiments 1 to 9-1.

For example, the number of at least one second DMRS and a location of the mapped symbol may be set through the method of Embodiment 4.

Alternatively, when the downlink data are a broadcast/multicast PDSCH transmitted before the number and location of the at least one additional DMRS are set or a unicast PDSCH before the RRC connection, the number and location of the at least one additional DMRS may be set by Embodiment(s) 9 and/or 9-1.

Further, the processor may control the RF unit to receive downlink data from the base station.

Figure 22:
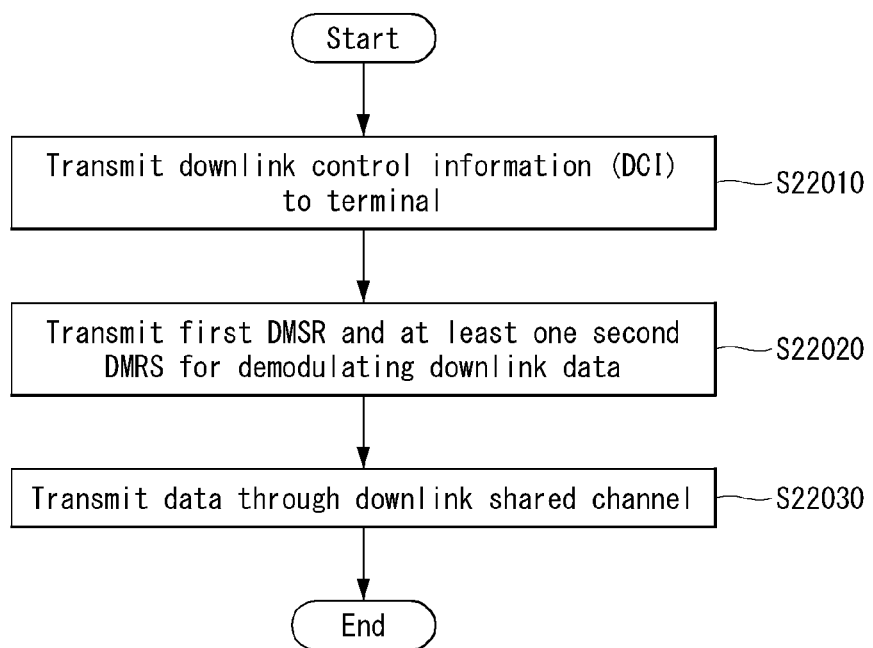
FIG. 22 is a flowchart illustrating an example of a method of transmitting and receiving data of a base station proposed in the present disclosure.

FIG. 22 is a flowchart illustrating an example of a method of transmitting and receiving data of a base station proposed in the present disclosure. FIG. 22 is merely for convenience of description and does not limit the scope of the present disclosure.

Referring to FIG. 22, the base station may perform the method(s) described in the above-described embodiments of the present disclosure. The base station may support the method described in Embodiments 1 to 9-1. In FIG. 22, a detailed description repeated with the above description will be omitted.

First, the base station may transmit downlink control information (DCI) to the UE (S22010). In this case, the downlink control information described in Embodiments 1 to 9-1 may include symbol information related to a last symbol of the downlink shared channel.

Thereafter, the base station may transmit a front-load DMRS (first DMRS) and at least one additional DMRS (second DMRS) for demodulating downlink data (S22020).

In this case, the number of the at least one second DMRS and a location of the mapped symbol may be determined according to symbol information, as in the method described in Embodiments 1 to 9-1.

For example, the number of at least one second DMRS and a location of the mapped symbol may be set through the method of Embodiment 4.

Alternatively, when the downlink data are a broadcast/multicast PDSCH transmitted before the number and location of at least one additional DMRS are set or a unicast PDSCH before the RRC connection, the number and location of the at least one additional DMRS may be set by Embodiment(s) 9 and/or 9-1.

Thereafter, the base station may transmit data through the downlink shared channel (S22030).

The base station may be configured with a processor, an RF unit, and a memory, as illustrated in FIGS. 23 to 26, and the processor may control the RF unit to transmit downlink control information (DCI) from the UE.

In this case, the downlink control information described in Embodiments 1 to 9-1 may include symbol information related to a last symbol of the downlink shared channel.

Further, the processor may control the RF unit to transmit a first DMRS and at least one second DMRS for demodulating downlink data.

In this case, the number of the at least one second DMRS and a location of the mapped symbol may be determined according to symbol information, as in the method described in Embodiments 1 to 9-1.

For example, the number of at least one second DMRS and a location of the mapped symbol may be set through the method of Embodiment 4.

Alternatively, when downlink data are a broadcast/multicast PDSCH transmitted before the number and location of at least one additional DMRS are set or a unicast PDSCH before the RRC connection, the number and location of the at least one additional DMRS may be set by Embodiment(s) 9 and/or 9-1.

Further, the processor may control the RF unit to transmit downlink data to the UE.

General Apparatus in which the Present Disclosure May be Applied

Figure 23:
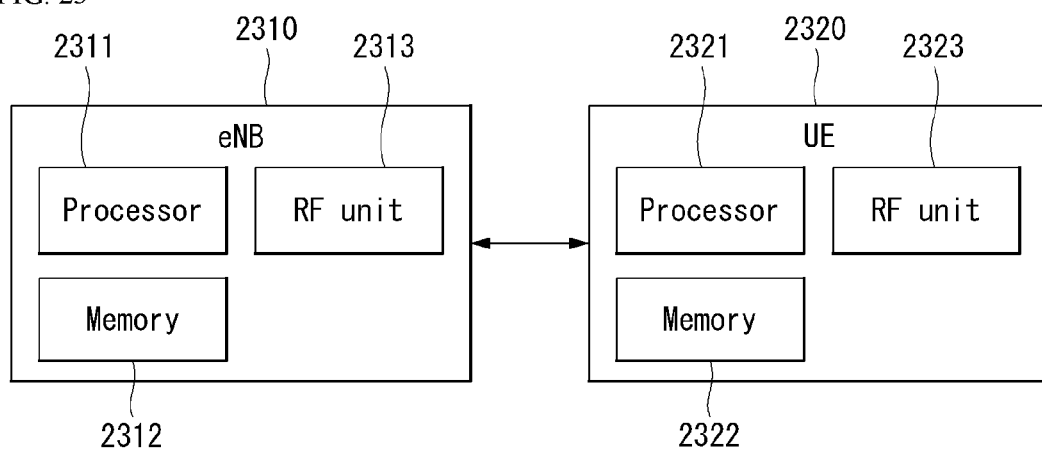
FIG. 23 is a diagram illustrating an example of an internal block diagram of a wireless device to which the present disclosure may be applied.

FIG. 23 is a block diagram illustrating a configuration of a wireless communication device to which methods suggested in the present disclosure may be applied.

Referring to FIG. 23, a wireless communication system includes an eNB 2310 and a plurality of UEs 2320 located within an eNB 2310 area.

The eNB and the UE may each be represented with a wireless device.

The eNB 2310 includes a processor 2311, a memory 2312, and a radio frequency module (RF module) 2313. The processor 2311 implements a function, a process, and/or a method suggested in FIGS. 1 to 23. Layers of a wireless interface protocol may be implemented by the processor. The memory 2312 is connected to the processor to store various information for driving the processor. The RF module 2313 is connected to the processor to transmit and/or receive an RF signal.

The UE 2320 includes a processor 2321, a memory 2322, and an RF module 2323.

The processor 2321 implements a function, a process, and/or a method suggested in FIGS. 1 to 22. Layers of a wireless interface protocol may be implemented by the processor. The memory 2322 is connected to the processor to store various information for driving the processor. The RF module 1923 is connected to the processor to transmit and/or receive an RF signal.

The memories 2312 and 2322 may exist at the inside or the outside of the processors 2311 and 2321 and may be connected to the processors 2311 and 2321, respectively, by well-known various means.

Further, the eNB 2310 and/or the UE 2320 may have a single antenna or a multiple antenna.

Figure 24:
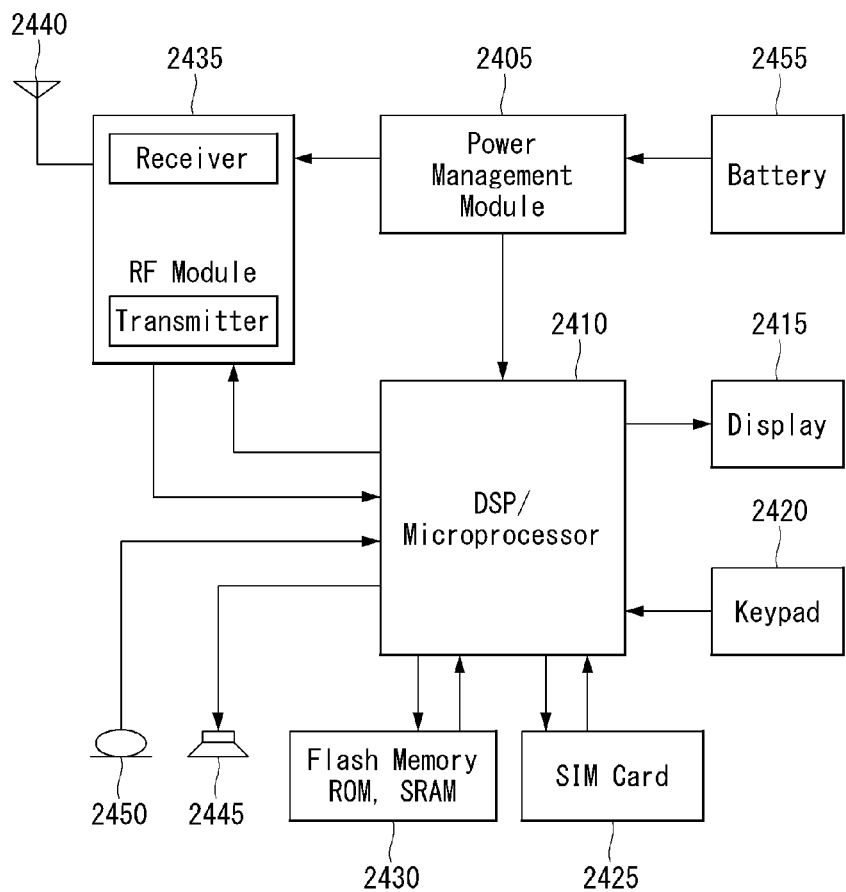
FIG. 24 is a block diagram illustrating a configuration of a communication device according to an embodiment of the present disclosure.

FIG. 24 is a block diagram illustrating a configuration of a communication device according to an embodiment of the present disclosure.

In particular, FIG. 24 is a diagram illustrating in more detail the UE of FIG. 23.

Referring to FIG. 24, the UE may include a processor (or digital signal processor (DSP)) 2410, an RF module (or RF unit) 2435, a power management module 2405, an antenna 2440, a battery 2455, a display 2415, a keypad 2420, a memory 2430, a subscriber identification module (SIM) card 2425 (this element is an option), a speaker 2445, and a microphone 2450. The UE may include a single antenna or multiple antennas.

The processor 2410 implements a function, a process, and/or a method suggested in FIGS. 11A to 22. Layers of a wireless interface protocol may be implemented by the processor.

The memory 2430 is connected to the processor and stores information related to an operation of the processor. The memory 2430 may exist at the inside or the outside of the processor and may be connected to the processor by well-known various means.

The user inputs, for example, command information such as a phone number by pressing (touching) a button of the keypad 2420 or by voice activation using the microphone 2450. The processor processes to perform an appropriate function such as reception of such command information and calling with a phone number. Operational data may be extracted from the SIM card 2425 or the memory 2430. Further, for user recognition and convenience, the processor may display command information or driving information on the display 2415.

The RF module 2435 is connected to the processor to transmit and/or receive an RF signal. In order to start communication, for example, in order to transmit a wireless signal constituting voice communication data, the processor transfers command information to the RF module. In order to receive and transmit a wireless signal, the RF module is configured with a receiver and a transmitter. The antenna 2440 performs a function of transmitting and receiving a wireless signal. When receiving a wireless signal, the RF module may transfer a signal in order to process by the processor and convert a signal with a base band. The processed signal may be converted to audible or readable information output through the speaker 2445.

Figure 25:
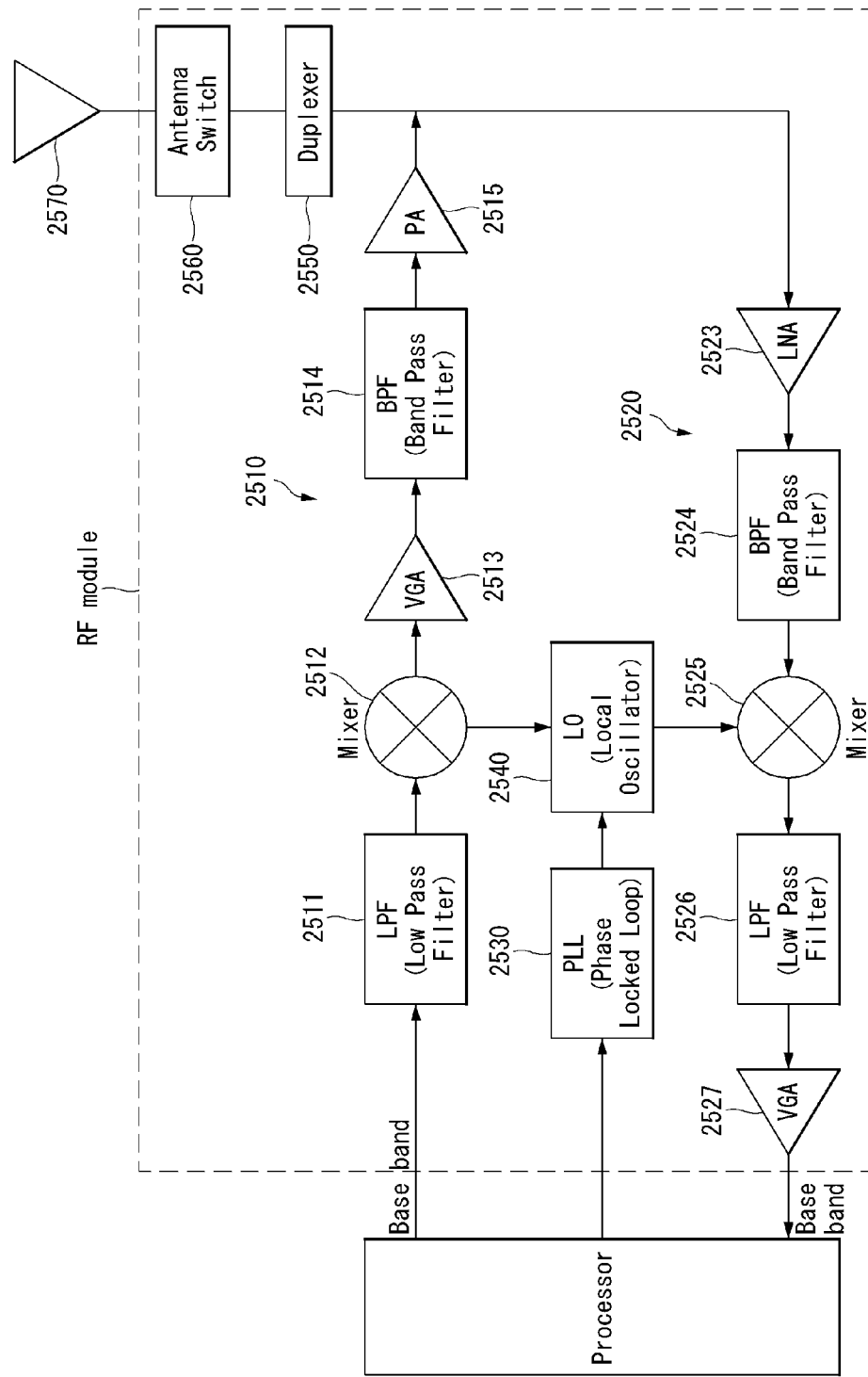
FIG. 25 is a diagram illustrating an example of an RF module of a wireless communication device to which a method proposed in this disclosure may be applied.

FIG. 25 is a diagram illustrating an example of an RF module of a wireless communication device to which a method proposed in this disclosure may be applied.

Specifically, FIG. 25 illustrates an example of an RF module that may be implemented in a frequency division duplex (FDD) system.

First, in a transmission path, the processor described in FIGS. 24 and 25 processes data to be transmitted and provides an analog output signal to a transmitter 2510.

Within the transmitter 2510, the analog output signal is filtered by a low pass filter (LPF) 2511 so as to remove images caused by digital-to-analog conversion (ADC), is up-converted from a baseband to an RF by a mixer 2512, and is amplified by a Variable Gain Amplifier (VGA) 2513, and the amplified signal is filtered by a filter 2514, is additionally amplified by a power amplifier (PA) 2515, is routed through duplexer(s) 2550/antenna switch(s) 2560, and is transmitted through an antenna 2570.

Further, in a receiving path, the antenna 2570 receives signals from the outside and provides the received signals, and the signals are routed through the antenna switch(s) 2560/duplexers 2550 and are provided to a receiver 2520.

Within the receiver 2520, the received signals are amplified by a Low Noise Amplifier (LNA) 2523, are filtered by a bandpass filter 2524, and are down-converted from an RF to a baseband by a mixer 2525.

The down-converted signal is filtered by a low pass filter (LPF) 2526 and is amplified by a VGA 2527 to obtain an analog input signal, which is provided to the processor described in FIGS. 12 and 13.

Further, a local oscillator (LO) generator 2540 generates transmitting and receiving LO signals and provides the transmitting and receiving LO signals to the mixer 2512 and the mixer 2525, respectively.

Further, in order to generate transmitting and receiving LO signals at appropriate frequencies, a Phase Locked Loop (PLL) 2530 receives control information from the processor and provides control signals to the LO generator 2540.

Further, the circuits illustrated in FIG. 25 may be arranged differently from the configuration illustrated in FIG. 25.

Figure 26:
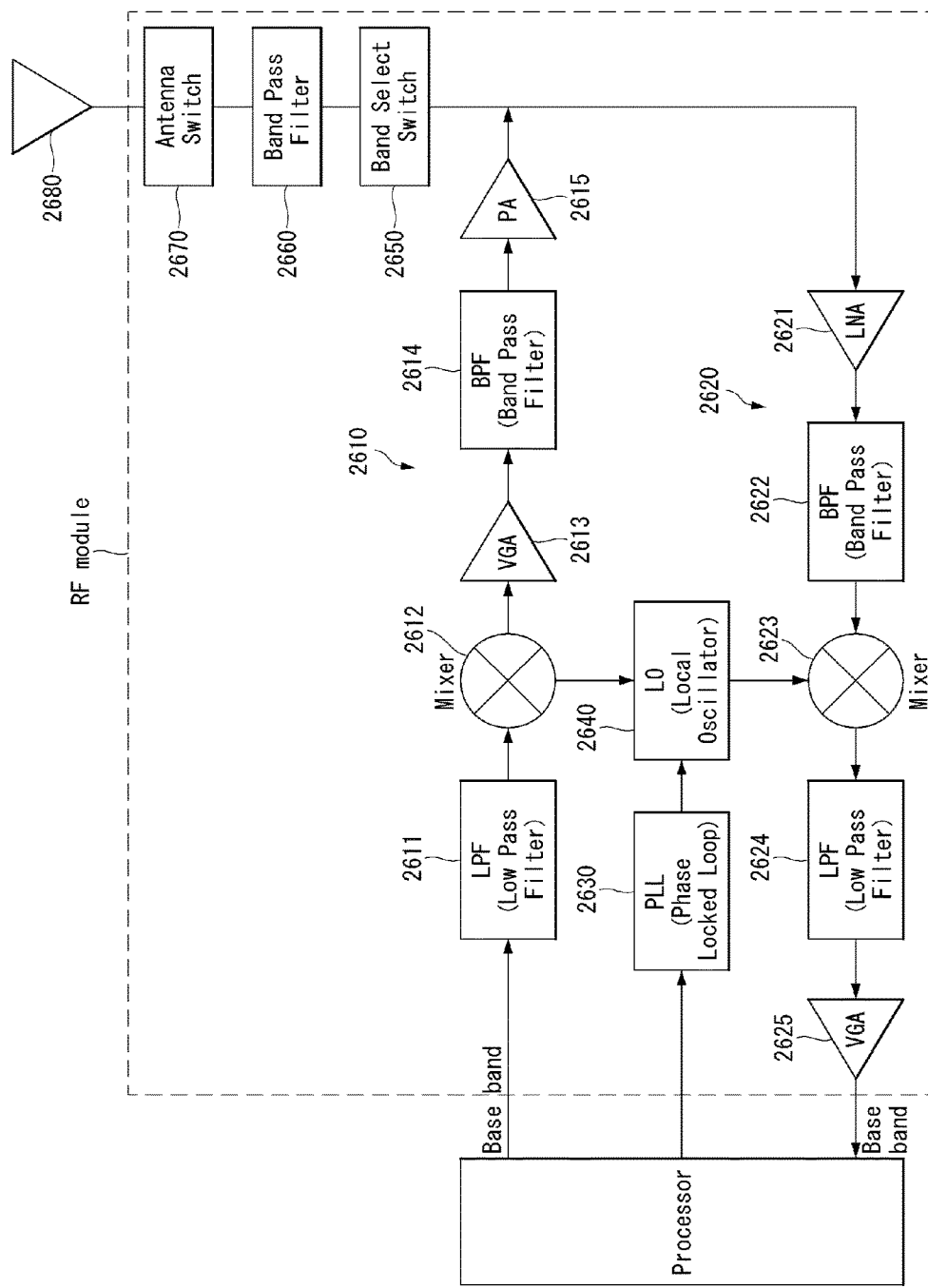
FIG. 26 is a diagram illustrating another example of an RF module of a wireless communication device to which a method proposed in this disclosure may be applied.

FIG. 26 is a diagram illustrating another example of an RF module of a wireless communication device to which a method proposed in this disclosure may be applied.

Specifically, FIG. 26 illustrates an example of an RF module that may be implemented in a time division duplex (TDD) system.

A transmitter 2610 and receiver 2620 of the RF module in the TDD system have the same structure as that of a transmitter and receiver of an RF module in an FDD system. Hereinafter, the RF module of the TDD system will be described only for a structure that differs from the RF module of the FDD system, and a description of the same structure will be described with reference to FIG. 25.

A signal amplified by a power amplifier (PA) 2615 of the transmitter is routed through a band select switch 2650, a band pass filter (BPF) 2660, and an antenna switch(s) 2670 and is transmitted through an antenna 2680.

Further, in a receiving path, the antenna 2680 receives signals from the outside and provides the received signals, and the signals are routed through the antenna switch(s) 2670, the BPF 2660, and the band select switch 2650 and are provided to the receiver 2620.

In the foregoing embodiments, the elements and characteristics of the present disclosure have been combined in specific forms. Each of the elements or characteristics should be considered to be optional unless otherwise described explicitly. Each of the elements or characteristics may be implemented in a form that does not combine with other elements or characteristics. Further, some of the elements and/or the characteristics may be combined to constitute an embodiment of the present disclosure. The order of the operations described in the embodiments of the present disclosure may be changed. Some of the elements or characteristics of an embodiment may be included in another embodiment or may be replaced with corresponding elements or characteristics of another embodiment. It is evident that an embodiment may be configured by combining claims having no explicit citation relation in the claims or may be included as a new claim by amendments after filing an application.

The embodiment according to the present disclosure may be implemented by various means, for example, hardware, firmware, software, or a combination thereof. In the case of an implementation by hardware, the embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

In the case of an implementation by firmware or software, the embodiment of the present disclosure may be implemented in the form of a module, procedure or function for performing the aforementioned functions or operations. A software code may be stored in the memory to be driven by the processor. The memory may be located inside or outside the processor to exchange data with the processor by various known means.

It is evident to those skilled in the art that the present disclosure may be materialized in other specific forms without departing from essential characteristics thereof. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

Further, for convenience of description, embodiments are described with reference to each drawing, but embodiments described with reference to each drawing may be combined to implement a new embodiment. According to the needs of those skilled in the art, it is also within the scope of the present disclosure to design a computer-readable recording medium having a program recorded thereon for executing the above-described embodiments.

A method of transmitting and receiving a reference signal according to this disclosure is not limited to a configuration and method of the embodiments, and for various changes of the embodiments, the entire or a portion of embodiments may be selectively combined.

A method of transmitting and receiving a reference signal of the present disclosure may be implemented into a processor readable code in a processor readable recording medium provided in a network device. The processor readable recording medium includes an entire kind of record device that stores data that may be read by a processor. The processor readable recording medium may include, for example, a read-only memory (ROM), a random-access memory (RAM), a CD-ROM, a magnetic tape, a floppy disk, and an optical data storage apparatus and includes implementation in a form of a carrier wave such as transmission through Internet. Further, in the processor readable recording medium, codes that are distributed in a computer system connected to a network and in which a processor may read with a distributed method may be stored and executed.

Further, in the foregoing description, embodiments of the present disclosure are described, but the present disclosure is not limited to the foregoing specific embodiment and changes and variations may be made by those having ordinary skill in the art without departing from the spirit or scope of the following claims and all such changes, modifications and alterations should not be individually understood from the scope of the present disclosure.

Further, in this disclosure, both the object disclosure and the method disclosure are described, and a description of both disclosures may be supplementally applied, as needed.

In a wireless communication system of the present disclosure, an RRC connection method has been described in an example applied to a 3GPP LTE/LTE-A system, but may be applied to various wireless communication systems in addition to a 3GPP LTE/LTE-A system.

The invention claimed is:

1. A method performed by a terminal operating in a wireless communication system, the method comprising:
    receiving, from a base station, first control information related to a number of symbol positions for receiving additional demodulation reference signal(DMRS) on a physical downlink shared channel(PDSCH);
    receiving, from the base station, Downlink Control Information (DCI) comprising second control information related to (i) a PDSCH duration from a first symbol to a last symbol of the PDSCH and (ii) a position of the first symbol of the PDSCH in a slot related to the PDSCH is scheduled;
    determining, by the terminal, at least one symbol position for receiving the additional DMRS on the PDSCH, based on the first control information and the second control information; and
    receiving, from the base station, the additional DMRS on the at least one symbol position on the PDSCH,
    wherein determining the at least one symbol position for receiving the additional DMRS on the PDSCH based on the first control information and the second control information comprises:
        based on the first control information indicating 3 symbol positions for the additional DMRS, and based on the second control information indicating a position of the last symbol of the PDSCH in the slot as one of 12th, 13th, or 14th symbol based on (i) the PDSCH duration and (ii) the position of the first symbol: determining the at least one symbol position for the additional DMRS as equal to a 6th symbol, an 9th symbol, and an 12th symbol in the slot;
        based on the first control information indicating 3 symbol positions for the additional DMRS, and based on the second control information indicating the position of the last symbol of the PDSCH in the slot as one of 11th or 10th symbol based on (i) the PDSCH duration and (ii) the position of the first symbol: determining the at least one symbol position for the additional DMRS as equal to a 7th symbol and a 10th symbol in the slot; and
        based on the first control information indicating 3 symbol positions for the additional DMRS, and based on the second control information indicating the last symbol of the PDSCH as 9th symbol based on (i) the PDSCH duration and (ii) the position of the first symbol: determining the at least one symbol position for the additional DMRS as equal to a 8th symbol in the slot.

2. The method of claim 1, wherein the PDSCH duration from the first symbol to the last symbol of the PDSCH is equal to a total number of symbols from the first symbol to the last symbol, including the first symbol and the last symbol.

3. The method of claim 1,
    wherein the 6th symbol in the slot related to the PDSCH has a symbol index equal to 5,
    wherein the 7th symbol in the slot related to the PDSCH has a symbol index equal to 6,
    wherein the 8th symbol in the slot related to the PDSCH has a symbol index equal to 7,
    wherein the 9th symbol in the slot related to the PDSCH has a symbol index equal to 8,
    wherein the 10th symbol in the slot related to the PDSCH has a symbol index equal to 9, and
    wherein the 12th symbol in the slot related to the PDSCH has a symbol index equal to 11.

4. The method of claim 1,
    wherein the first control information is received from the base station through Radio Resource Control (RRC) signaling.

5. The method of claim 1, further comprising:
    receiving, from the base station through higher-layer signaling, third control information related to a number of symbol positions for a front-loaded DMRS on the PDSCH.

6. The method of claim 5, further comprising:
    receiving, from the base station, the front-loaded DMRS on at least one symbol position for the front-loaded DMRS on the PDSCH, based on the third control information.

7. A terminal configured to operate in a wireless communication system, the terminal comprising:
    a transceiver;
    at least one processor; and
    at least one computer memory operably connectable to the at least one processor and storing instructions that, when executed by the at least one processor, perform operations comprising;
    receiving, from a base station through the transceiver, first control information related to a number of symbol positions for receiving additional demodulation reference signal(DMRS) on a physical downlink shared channel(PDSCH);
    receiving, from the base station through the transceiver, Downlink Control Information (DCI) comprising second control information related to (i) a PDSCH duration from a first symbol to a last symbol of the PDSCH and (ii) a position of the first symbol of the PDSCH in a slot related to the PDSCH is scheduled;

determining, by the terminal, at least one symbol position for receiving the additional DMRS on the PDSCH, based on the first control information and the second control information; and receiving, from the base station through the transceiver, the additional DMRS on the at least one symbol position on the PDSCH, wherein determining the at least one symbol position for receiving the additional DMRS on the PDSCH based on the first control information and the second control information comprises:

based on the first control information indicating 3 symbol positions for the additional DMRS, and based on the second control information indicating a position of the last symbol of the PDSCH in the slot as one of 12th, 13th, or 14th symbol based on (i) the PDSCH duration and (ii) the position of the first symbol: determining the at least one symbol position for the additional DMRS as equal to a 6th symbol, an 9th symbol, and an 12th symbol in the slot;

based on the first control information indicating 3 symbol positions for the additional DMRS, and based on the second control information indicating the position of the last symbol of the PDSCH in the slot as one of 11th or 10th symbol based on (i) the PDSCH duration and (ii) the position of the first symbol: determining the at least one symbol position for the additional DMRS as equal to a 7th symbol and a 10th symbol in the slot; and based on the first control information indicating 3 symbol positions for the additional DMRS, and based on the second control information indicating the last symbol of the PDSCH as 9th symbol based on (i) the PDSCH duration and (ii) the position of the first symbol: determining the at least one symbol position for the additional DMRS as equal to a 8th symbol in the slot.

8. The terminal of claim 7, wherein the PDSCH duration from the first symbol to the last symbol of the PDSCH is equal to a total number of symbols from the first symbol to the last symbol, including the first symbol and the last symbol.

9. The terminal of claim 7,
wherein the 6th symbol in the slot related to the PDSCH has a symbol index equal to 5,
wherein the 7th symbol in the slot related to the PDSCH has a symbol index equal to 6,
wherein the 8th symbol in the slot related to the PDSCH has a symbol index equal to 7,
wherein the 9th symbol in the slot related to the PDSCH has a symbol index equal to 8,
wherein the 10th symbol in the slot related to the PDSCH has a symbol index equal to 9, and
wherein the 12th symbol in the slot related to the PDSCH has a symbol index equal to 11.

10. The terminal of claim 7,
wherein the first control information is received from the base station through Radio Resource Control (RRC) signaling.

11. The terminal of claim 7, wherein the operations further comprise:
receiving, from the base station through the transceiver via higher-layer signaling, third control information related to a number of symbol positions for a front-loaded DMRS on the PDSCH.

12. The terminal of claim 11, wherein the operations further comprise:

receiving, from the base station through the transceiver, the front-loaded DMRS on at least one symbol position for the front-loaded DMRS on the PDSCH, based on the third control information.

13. A method performed by a base station operating in a wireless communication system, the method comprising:
transmitting, to a terminal, first control information related to a number of symbol positions for receiving additional demodulation reference signal (DMRS) on a physical downlink shared channel (PDSCH);

transmitting, to the terminal, Downlink Control Information (DCI) comprising second control information related to (i) a PDSCH duration from a first symbol to a last symbol of the PDSCH and (ii) a position of the first symbol of the PDSCH in a slot related to the PDSCH is scheduled;

mapping, by the base station, an additional DMRS to at least one symbol position for receiving the additional DMRS on the PDSCH, wherein the at least one symbol position to which the additional DMRS is mapped is determined based on the first control information and the second control information; and transmitting, to the terminal, the additional DMRS on the at least one symbol position on the PDSCH, wherein the at least one symbol position to which the additional DMRS is mapped is determined according to:

based on the first control information indicating 3 symbol positions for the additional DMRS, and based on a position of the last symbol of the PDSCH in the slot being one of 12th, 13th, or 14th symbol based on (i) the PDSCH duration and (ii) the position of the first symbol: the at least one symbol position for the additional DMRS is equal to a 6th symbol, an 9th symbol, and an 12th symbol in the slot;

based on the first control information indicating 3 symbol positions for the additional DMRS, and based on the position of the last symbol of the PDSCH in the slot being one of 11th or 10th symbol based on (i) in the PDSCH duration and (ii) the position of the first symbol: the at least one symbol position for the additional DMRS is equal to a 7th symbol and a 10th symbol in the slot; and based on the first control information indicating 3 symbol positions for the additional DMRS, and based on the position of the last symbol of the PDSCH in the slot being 9th symbol based on (i) the PDSCH duration and (ii) the position of the first symbol: the at least one symbol position for the additional DMRS is equal to a 8th symbol in the slot.

14. The method of claim 13,
wherein the PDSCH duration from the first symbol to the last symbol of the PDSCH is equal to a total number of symbols from the first symbol to the last symbol, including the first symbol and the last symbol.

15. The method of claim 13,
wherein the 6th symbol in the slot related to the PDSCH has a symbol index equal to 5,
wherein the 7th symbol in the slot related to the PDSCH has a symbol index equal to 6,
wherein the 8th symbol in the slot related to the PDSCH has a symbol index equal to 7,
wherein the 9th symbol in the slot related to the PDSCH has a symbol index equal to 8,
wherein the 10th symbol in the slot related to the PDSCH has a symbol index equal to 9, and wherein the 12th symbol in the slow related to the PDSCH has a symbol index equal to 11.

16. The method of claim 13,
wherein the first control information is transmitted to the terminal through Radio Resource Control (RRC) signaling.

17. The method of claim 13, further comprising:
transmitting, to the terminal through higher-layer signaling, third control information related to a number of symbol positions for a front-loaded DMRS on the PDSCH.

18. The method of claim 17, further comprising:
transmitting, to the terminal, the front-loaded DMRS on at least one symbol position for the front-loaded DMRS on the PDSCH, based on the third control information.

* * * * *